US012705298B2

(12) United States Patent
Zhang

(10) Patent No.: US 12,705,298 B2
(45) Date of Patent: Aug. 11, 2026

(54) DISPLAYING AN ONLINE PAGE TOGETHER WITH A PAGE OF AN INSTALLATION-FREE APPLICATION

(71) Applicant: Tencent Technology (Shenzhen) Company Limited, Shenzhen (CN)

(72) Inventor: Yanlu Zhang, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 177 days.

(21) Appl. No.: 18/434,759

(22) Filed: Feb. 6, 2024

(65) Prior Publication Data

US 2024/0176838 A1 May 30, 2024

Related U.S. Application Data

(63) Continuation of application No. PCT/CN2023/119930, filed on Sep. 20, 2023.

(30) Foreign Application Priority Data

Sep. 30, 2022 (CN) ......................... 202211214344.3

(51) Int. Cl.
*G06F 16/958* (2019.01)
*G06F 3/0481* (2022.01)
*G06F 16/957* (2019.01)

(52) U.S. Cl.
CPC ........ *G06F 16/9577* (2019.01); *G06F 3/0481* (2013.01); *G06F 16/986* (2019.01); *G06F 2203/04803* (2013.01)

(58) Field of Classification Search
CPC .. G06F 16/9577; G06F 16/986; G06F 3/0481; G06F 2203/04803
See application file for complete search history.

(56) References Cited

U.S. PATENT DOCUMENTS 9,324,098 B1 * 4/2016 Agrawal ................ G06Q 30/04
2009/0164949 A1 * 6/2009 Henkin .................. G06Q 30/02 715/862

(Continued)

FOREIGN PATENT DOCUMENTS

CN 111723558 A 9/2020
CN 112698772 A 4/2021

(Continued)

OTHER PUBLICATIONS

Carlo Bernaschina et al., Online Model Editing, Simulation and Code Generation for Web and Mobile Applications, May 1, 2017, International Workshop on Modelling in Software Enginerring, pp. 33-39 (Year: 2017).*

(Continued)

*Primary Examiner* — Tam T Tran
(74) *Attorney, Agent, or Firm* — ARENTFOX SCHIFF LLP

(57) ABSTRACT

A page processing method includes displaying an online document page, including a link to a first display page corresponding to an installation-free application, and displaying the first display page in response to the link to the first display page being triggered. The method further includes, during the display of the first display page, maintaining a display state of the online document page such that input to the online document page is processed and displayed in the online document page and input to the first display page is processed and displayed in the first display page.

20 Claims, 15 Drawing Sheets

(56) References Cited

U.S. PATENT DOCUMENTS

| | | | | |
|---|---|---|---|---|
| 2010/0185473 | A1* | 7/2010 | Malkareddy | G06Q 30/0241<br>705/30 |
| 2015/0067638 | A1* | 3/2015 | Xia | G06F 9/542<br>717/107 |
| 2021/0306711 | A1* | 9/2021 | Ellingford | H04N 21/6125 |
| 2024/0354128 | A1* | 10/2024 | Li | G06F 3/14 |

FOREIGN PATENT DOCUMENTS

| | | | |
|---|---|---|---|
| CN | 112990902 | A | 6/2021 |
| CN | 114282494 | A | 4/2022 |

OTHER PUBLICATIONS

Jaewon Oh et al., Automated Transformation of Template-Based Web Applications into Single-Page Applications, Jul. 1, 2013, IEEE Annual Computer Software and Applications Conference, pp. 292-302 (Year: 2013).*

International Search Report and Written Opinion issued Nov. 23, 2023 in Application No. PCT/CN2023/119930 with English Translation, 22 pages.

* cited by examiner

Third-party platform
Service system automation
Recommendation algorithm
Output a behavior
Standardization
Standardization
Output a material
User pool
Consume content by using a label
Produce content by using a label
Content library
Output
Recommended content for a user A
Recommended content for a user B
...
Recommended content for a user N
Access
Document development interface
Output
Online document
Recommended content for a user A
Deliver
User A views
Open an information display page of an object
Complete an operation
Close an information display page of an object
Continue viewing
Open an information display page of an object
Complete a transaction
Open an information display page of an object
Recommended content for a user B
Deliver
User B views
Complete an operation
...
...
Open an information display page of an object
Recommended content for a user N
Deliver
User N views
Complete an operation
...

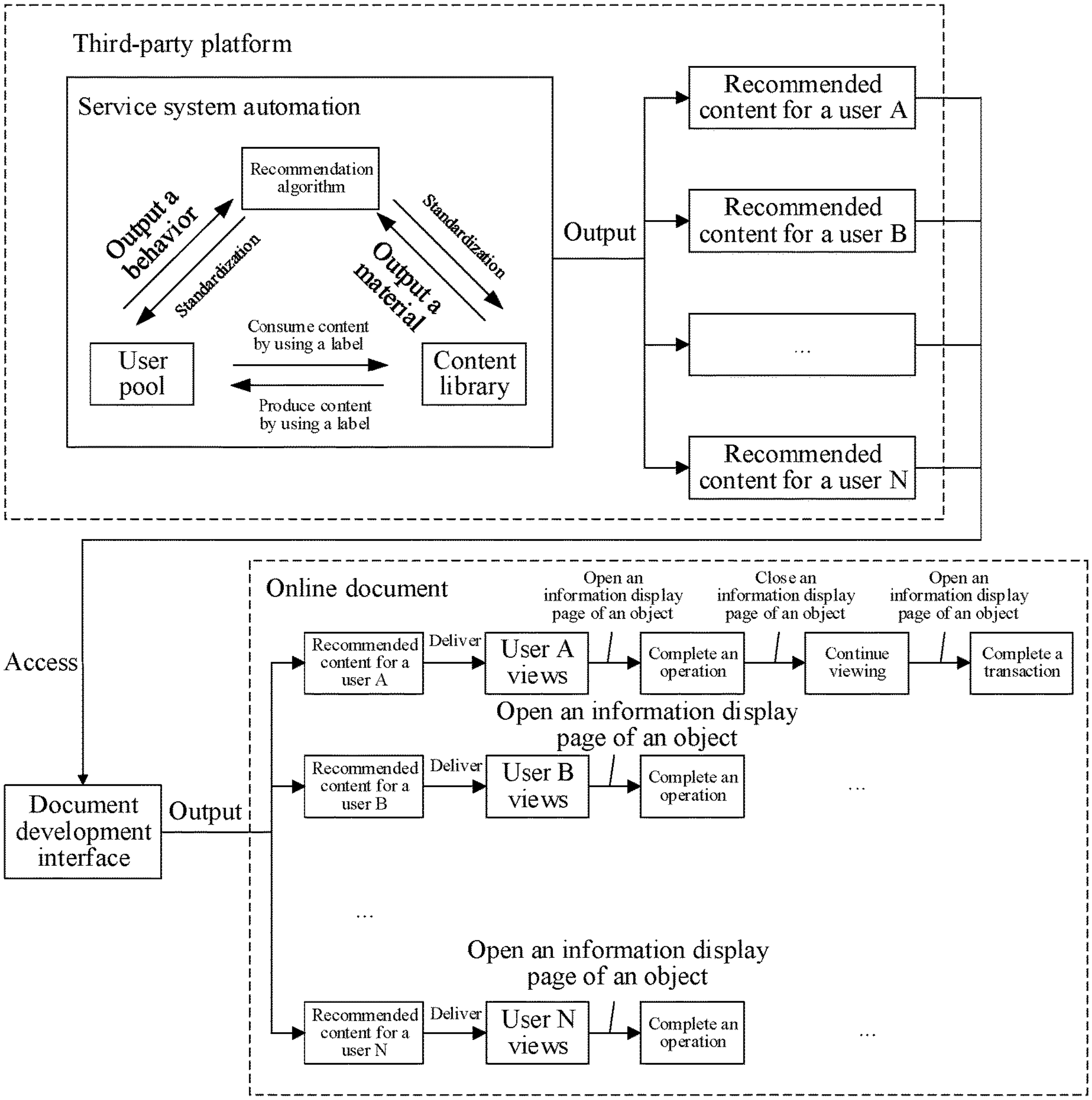

FIG. 9

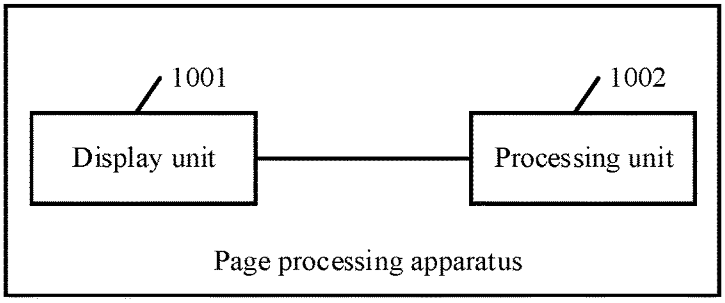

FIG. 10

DISPLAYING AN ONLINE PAGE TOGETHER WITH A PAGE OF AN INSTALLATION-FREE APPLICATION

RELATED APPLICATIONS

This application is a continuation of International Application No. PCT/CN2023/119930, filed on Sep. 20, 2023, which claims priority to Chinese Patent Application No. 202211214344.3, filed on Sep. 30, 2022, and entitled "PAGE PROCESSING METHOD AND APPARATUS, DEVICE, STORAGE MEDIUM, AND PRODUCT.", The disclosures of the prior applications are hereby incorporated by reference in their entirety.

FIELD OF THE TECHNOLOGY

This disclosure relates to the field of computer technologies, including a page processing method, a page processing apparatus, a computer device, a computer-readable storage medium, and a program product.

BACKGROUND OF THE DISCLOSURE

With the advancement of scientific and technological research, more transactions are transferred from offline to online processing, and online transaction processing includes page processing. For example, a transaction includes a plurality of steps, and the steps need to be processed on different online pages. A research finds that an online page needs to be loaded each time for entering the online page. This is less convenient.

SUMMARY

Aspects of this disclosure provide a page processing method and apparatus, a device, a computer-readable storage medium, and a program product. This improves convenience for accessing a page.

In an aspect, a page processing method includes displaying an online document page, including a link to a first display page corresponding to an installation-free application, and displaying the first display page in response to the link to the first display page being triggered. The method further includes, during the display of the first display page, maintaining a display state of the online document page such that input to the online document page is processed and displayed in the online document page and input to the first display page is processed and displayed in the first display page.

In an aspect, a page processing method includes displaying a document preview page, including a document template of an online document, and, when a document generation condition is satisfied, displaying an online document page that is generated based on the document template and based on recommendation information. The online document page includes a link to a first display page that corresponds to at least one recommended object in the recommendation information and includes a resource transfer operation. In an aspect, a page processing apparatus includes processing circuitry configured to display an online document page, including a link to a first display page corresponding to an installation-free application. The processing circuitry is further configured to display the first display page in response to the link to the first display page being triggered, and, during the display of the first display page, maintain a display state of the online document page such that input to the online document page is processed and displayed in the online document page and input to the first display page is processed and displayed in the first display page.

BRIEF DESCRIPTION OF THE DRAWINGS

To describe the technical solutions in the aspects of this disclosure, the accompanying drawings describing the aspects are briefly described below. The accompanying drawings in the following description show merely some aspects of this disclosure, and a person of ordinary skill in the art may still obtain other drawings from these accompanying drawings.

FIG. 9 is a schematic diagram of another online document page processing according to an aspect of this disclosure.

FIG. 10 is a schematic diagram of a structure of a page processing apparatus according to an aspect of this disclosure.

DETAILED DESCRIPTION

The technical solutions in the aspects of this disclosure are described below with reference to the accompanying drawings in the aspects of this disclosure. The described aspects are merely some rather than all of the aspects of this disclosure. All other aspects obtained by a person of ordinary skill in the art based on the aspects of this disclosure shall fall within the protection scope of this disclosure.

The following describes the page processing solutions in the aspects of this disclosure in detail with reference to the accompanying drawings.

The aspects of this disclosure relate to an installation-free application, that is, an application that can be used without download and installation. For example, the installation-free application may be a mini program or an applet, and the mini program or applet may exist in a client. The client (which is also called an application client or an APP client) refers to a program that is downloaded and installed in a terminal and runs in the terminal. The terminal may include various types of clients, including but not limited to: an instant messaging (IM) client, a social networking services (SNS) client, a content service client (such as a news client), an image processing client, a search client, and the like.

Figure 1:
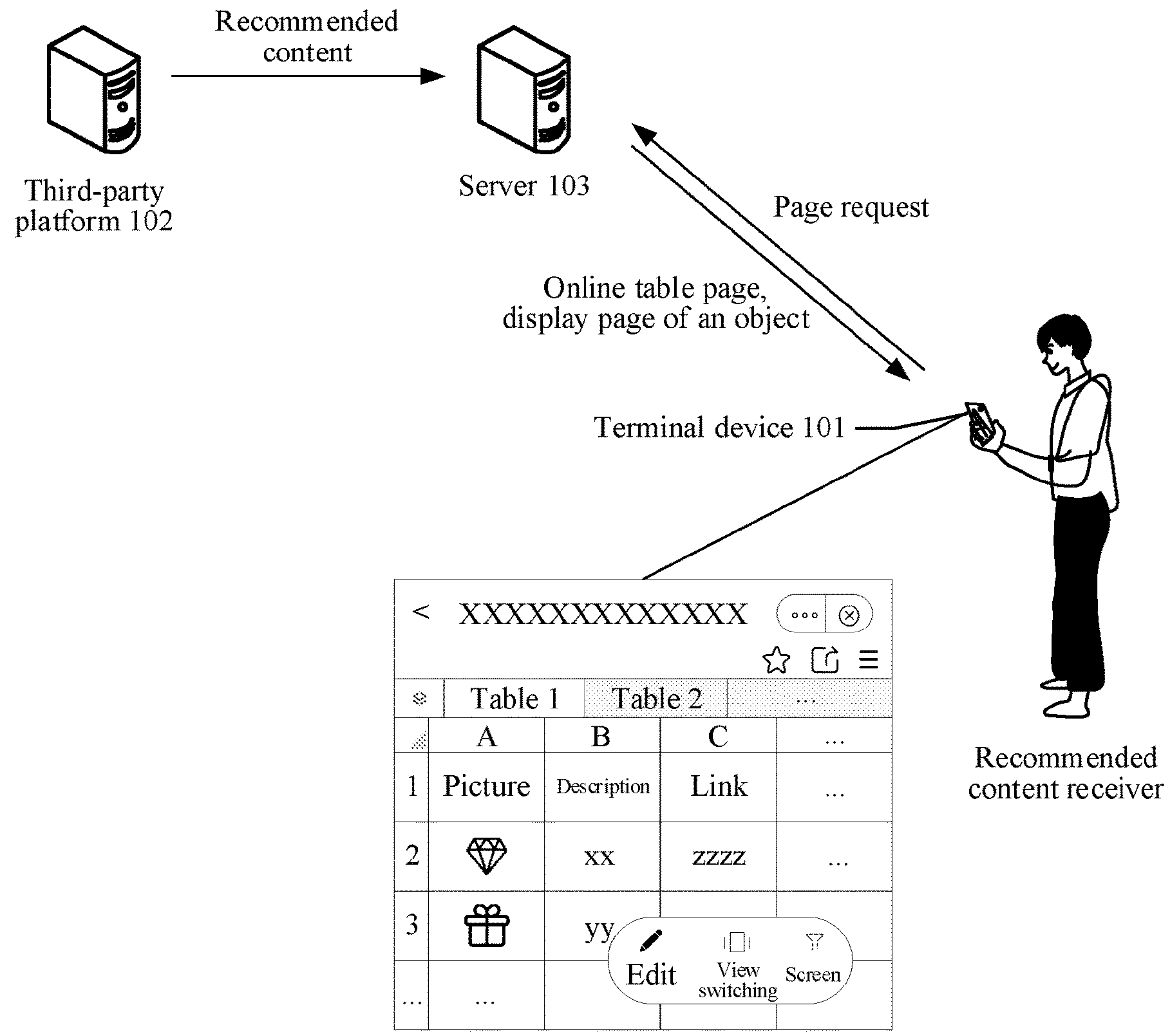
FIG. 1 is an architectural diagram of a scenario of a page processing system according to an aspect of this disclosure.

Aspects of this disclosure provide a page processing solution and a page processing system to improve page processing efficiency. FIG. 1 is an architectural diagram of a scenario of a page processing system according to an aspect of this disclosure. As shown in FIG. 1, the page processing system may include: a terminal device 101, a third-party platform 102, and a server 103. The page processing solution provided in the aspect of this disclosure may be performed by the terminal device 101 or the third-party platform 102. The terminal device 101 may include but is not limited to: an intelligent device with display and editing functions, such as a smartphone (for example, an Android mobile phone or an IOS mobile phone), a tablet computer, a portable personal computer, a mobile Internet device (MID for short), a vehicle-mounted terminal, a smart appliance, or a wearable device. This is not limited in this aspect of this disclosure. The server 102 may be an independent physical server, or a server cluster or distributed system including a plurality of physical servers, or a cloud server providing a cloud service, a cloud database, cloud computing, a cloud function, cloud storage, a network service, cloud communication, a middleware service, a domain name service, a security service, a content delivery network (CDN), big data, an artificial intelligence platform, and the like. This is not limited in this aspect of this disclosure.

A quantity of the terminal device, third-party platform, and server in FIG. 1 is only for example and does not constitute an actual limitation of this disclosure. For example, the page processing system may further include a terminal device 104, a third-party platform 105, or a server 106, and the like.

It may be understood that the specific implementations of this disclosure include obtaining a historical behavior record of a recommended content receiver. When the aspects of this disclosure are applied to a specific product or technology, a corresponding data obtaining permission (for example, a recommended content receiver authorizes the third-party platform 102) is needed to be obtained, and the collection, use and processing of relevant data need to comply with the relevant laws, regulations, and standards of relevant countries and regions.

In a specific implementation, a general principle of the page processing solution is as follows:

(1). The third-party platform 102 obtains feature information of M recommended content receivers, and M is a positive integer. In an implementation, the feature information of M recommended content receivers may be obtained by feature extraction of historical behavior records and relevant information about M recommended content receivers (such as friend relationships) after the third-party platform 102 obtains authorization from the M recommended content receivers. After obtaining the feature information of the M recommended content receivers, the third-party platform 102 may invoke a recommendation algorithm (such as a collaborative filtering algorithm) to screen out M groups of recommended content for M recommended content receiver from a candidate content library based on feature information of each recommended content receiver. A recommended content receiver corresponds to a group of recommended content, and a generation process of each group of recommended content is independent of each other, for example, at least partially different from each other.

(2) After obtaining the M groups of recommended content of the M recommended content receivers, the third-party platform 102 may call a document development interface (application program interface, API) provided by the server 103 to automatically generate M online documents for the M recommended content receivers based on the M groups of recommended content. Each group of recommended content includes at least one object (such as a recommended product, a video, and a game), and an online document page includes an entry (e.g., link) to a display page of the object. In an implementation, the third-party platform 102 may annotate each group of recommended content according to a preset grammatical rule. After obtaining the annotated recommended content, the server 103 writes the recommended content into a corresponding position in a preset document template based on annotated information, to obtain an online document.

(3) When any one of the M recommended content receivers triggers the online document on the terminal device 101 (for example, the recommended content receiver clicks on an online document entry), the terminal device 101 displays the online document page. An entry to a first display page is displayed in the online document page, and the first display page belongs to an installation-free application. In a specific implementation process, the online document page may be a separate network page, or may belong to an application. When the online document page belongs to an application, the application and an installation-free application may be the same or different.

(4) The terminal device 101 displays the first display page in response to the entry to the first display page being triggered (for example, the recommended content receiver clicks on the entry to the first display page), and the first display page supports a resource transfer operation. The first display page may specifically include but is not limited to: a product display page, a live streaming page, a resource download page, and a multimedia playback page. The terminal device 101 maintains a display state of the online document page during the display of the first display page. The maintaining a display state of the online document page may be understood as: when returning to the online document page, the online document page may be displayed directly without reloading. From the perspective of running in background, the maintaining a display state of the online document page means that during the display of the first display page, the terminal device 101 keeps a process corresponding to the online document page running.

In this aspect of this disclosure, by maintaining the display state of the online document page during the display of the first display page, the online document page may be directly displayed when exiting the first display page. This improves convenience for accessing a page. In addition, the document development interface automatically generates the online document based on the recommended content and outputs a corresponding online document to a different recommended content receiver, to achieve an objective of personalized recommendations for different recommended content receivers, and then different content (that is, data content in the online document page) is generated and provided for computer devices of different content receivers with respect to the same access entry (for example, an access address of the online document page). This can improve convenience and efficiency of data processing, as well as convenience of providing different content to different users, thereby improving efficiency and accuracy of a recommendation.

Based on the foregoing page processing solution, an aspect of this disclosure provides a more detailed page processing method. The page processing method provided in the aspect of this disclosure is introduced in detail below with reference to the accompanying drawings.

Figure 2:
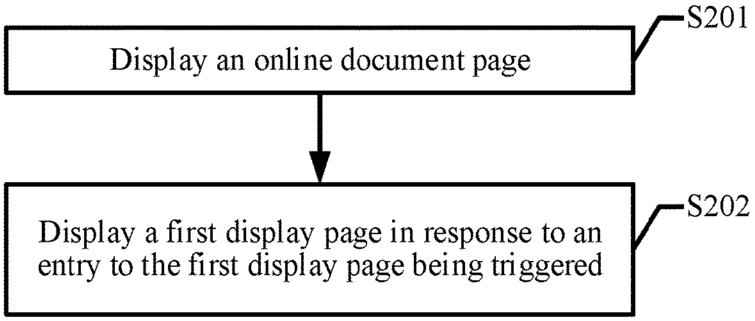
FIG. 2 is a flowchart of a page processing method according to an aspect of this disclosure.

FIG. 2 is a flowchart of a page processing method according to an aspect of this disclosure. The page processing method may be performed by a computer device that may be the terminal device 101 shown in FIG. 1. As shown in FIG. 2, the page processing method may include step S201 and step S202.

S201: Display an online document page.

An online document refers to a document that supports simultaneous editing by one or more editors having editing permissions. The online document page displays an entry to a first display page, and the first display page belongs to an installation-free application. An installation-free application is, for example, a mini program. The online document page may be a separate network page, or may belong to an application. When the online document page belongs to an application, the application and the installation-free application may be the same or different.

In an implementation, the online document page is displayed in a case that the computer device detects that the online document page satisfies a display condition, the online document page satisfies a display condition including but not limited to: a current moment matches preset time; an entry to the online document page (such as a link) is triggered; and an online document sent by a server is received.

S202: Display the first display page in response to the entry to the first display page being triggered.

The entry to the first display page may be specifically a link to a target object, or may be a picture, text, a key, or the like associated with the link to a target object. This is not limited in this disclosure. The first display page may specifically include but is not limited to: a product display page, a live streaming page, a resource download page, and a multimedia playback page.

In an implementation, the computer device maintains a display state of the online document page during the display of the first display page. The maintaining a display state of the online document page may be understood as: the online document page always exists during the display of the first display page. For example, during the display of the first display page, the online document page may be displayed in the computer device in a half-screen form, a semi-transparent form, or the like, or may be hidden (not displayed in the computer device). When returning to the online document page, the computer device may directly display the online document page that always exists without reloading. From the perspective of running in background, the maintaining a display state of the online document page means that during the display of the first display page, the computer device keeps a process (a thread) corresponding to the online document page running. In short, the maintaining a display state of the online document page may also be understood as maintaining a state of data loading of the online document page being completed. A data loading is, for example, loading and rendering corresponding data in a page instance.

In this aspect of this disclosure, the online document page is displayed, and the entry to the first display page is displayed in the online document page. The first display page is displayed in response to the entry to the first display page being triggered. During the display of the first display page, the display state of the online document page is maintained. It may be learned that by maintaining the display state of the online document page during the display of the first display page, the online document page may be directly displayed when exiting the first display page. This improves efficiency and convenience for accessing a page.

Figure 3:
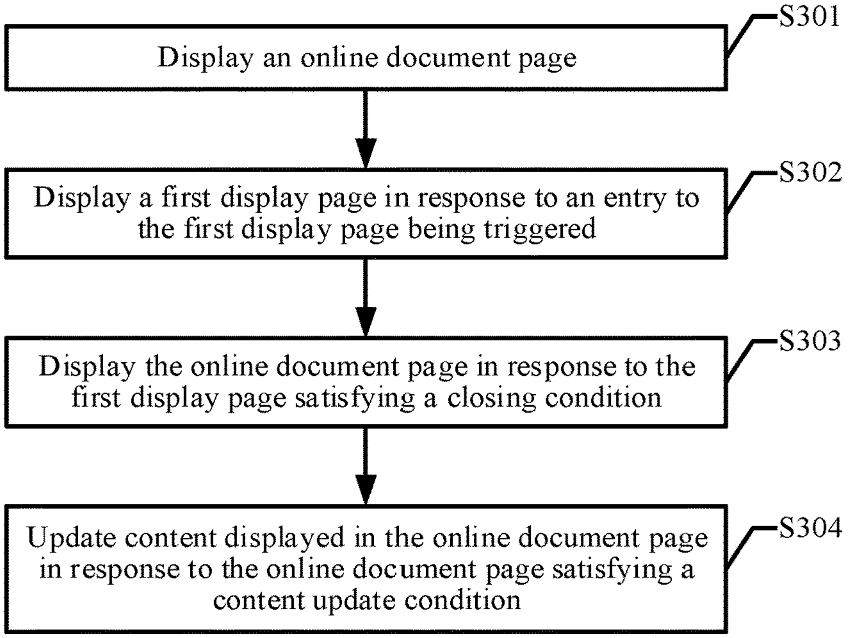
FIG. 3 is a flowchart of another page processing method according to an aspect of this disclosure.

FIG. 3 is a flowchart of another page processing method according to an aspect of this disclosure. The page processing method may be performed by a computer device that may be the terminal device 101 shown in FIG. 1. As shown in FIG. 3, the page processing method may include step S301 to step S304:

S301: Display an online document page. For example, the displayed online document page may include a link to a first display page.

A type of an online document in the online document page may include but is not limited to text and a table. The online document page displays an entry to a first display page, and the first display page belongs to an installation-free application. The online document page may be a separate network page, or may belong to an application. When the online document page belongs to an application, the application and the installation-free application may be the same or different. It may be understood that in a case that the application to which the online document page belongs and the installation-free application are different, a recommended content receiver may wake up the installation-free application by using the entry to the first display page.

In an implementation, the type of the online document in the online document page is a table, a table switching control is displayed in the online document page. The computer device switches and displays a table in the online document page, in response to the table switching control being triggered. For example, assuming that a table 1 is currently displayed in the online document page, in a case that the table switching control is triggered, the computer device switches the table 1 in the online document page to a table 2 for displaying.

In an aspect, one table corresponds to one table switching control. The computer device switches and displays a table in the online document page to the target table, in response to a target table switching control corresponding to a target table being triggered; and sets the target table switching control to a non-optional state, or performs highlighting on the target table switching control. The highlighting includes at least one of the following: highlight display, color switching display, bold display, and font change display.

In another implementation, a screening control is displayed in the online document page. The computer device displays a screening condition input entry in response to the screening control being triggered. In a case that a screening condition in the screening condition input entry is confirmed, content that satisfies the confirmed screening condition is displayed in the online document page. For example, assuming that the table in the online document page includes 4 rows of data, and the screening condition in the screening condition input entry is to retain odd-numbered rows of data, then in a case that a screening condition for the computer device in the screening condition input entry is confirmed, content that satisfies the confirmed screening condition is displayed in the online document page (to be specific, data in row 2 and row 4 of the original table are hidden, and data in row 1 and row 3 of the original table are displayed).

In yet another implementation, a view switching control is displayed in the online document page. The computer device switches a display mode of the online document in a case that the view switching control is triggered. For example, assuming that a type of the online document in the online document page is a table. The computer device switches the display mode of the online document to a card mode in a case that the view switching control is triggered. Each card carries one cell, row, or column of data in the table.

Figure 4A:
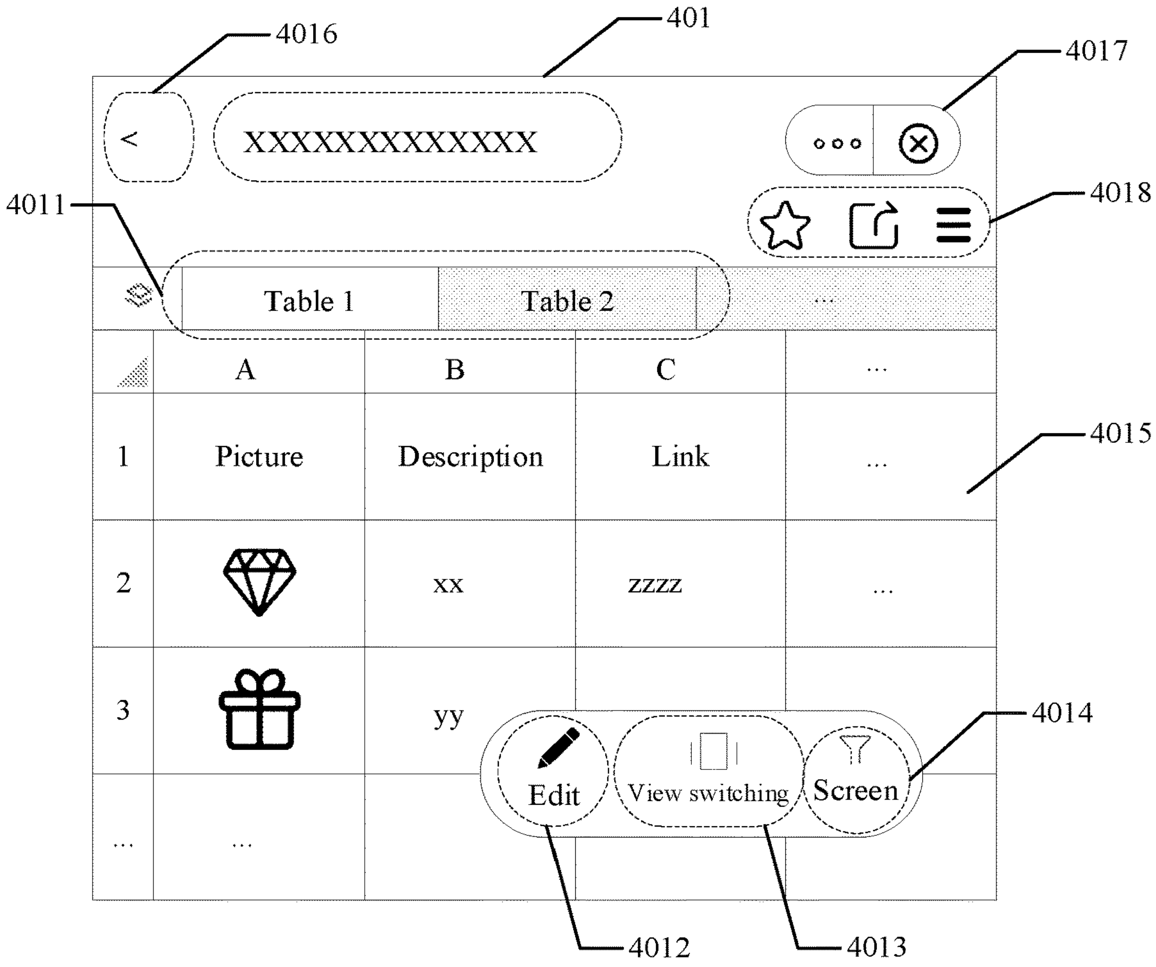
FIG. 4*a* is a schematic diagram of an online document page according to this disclosure.

FIG. 4*a* is a schematic diagram of an online document page according to this disclosure. As shown in FIG. 4*a*, an online table may be displayed in an online document page 401. In addition, the online document page may include at least one of the following: a table switching control 4011, an editing control 4012, a view switching control 4013, a screening control 4014, a table content display area 4015, a return key 4016, a page operation bar 4017, and a table operation bar 4018. The table switching control 4011 is used for switching a table displayed in the table content display area 4015. The editing control 4012 is used for editing the online table. For example, content displayed in the table content display area 4015 may be edited after a user clicks the editing control 4012. The view switching control 4013 is used for switching a display mode of the online table. For example, the online table is displayed in a form of cards in a case that the view switching control 4013 is triggered. Each card may include content of a cell, a column of cells, or a row of cells in the online table. The screening control 4014 is used for screening content in the online table. The table content display arca 4015 is used for displaying the content in the online table. The return key 4016 is used for returning to a previous page, such as returning to a homepage of an application. The page operation bar 4017 is used for operating the online document page. The page operation bar 4017 may include a close key (which is used for closing the online document page) and a toolbar key (which is used for opening a toolbar for a page operation, and the toolbar may include one or more operation keys for the online document page). The table operation bar 4018 is used for operating the online table. The table operation bar 4018 may include a favorite key (which is used for favoriting the online table), a sharing key (which is used for sharing the online table), and an operation list key (which is used for opening an operation list, and the operation list may include one or more operation keys for the online table).

S302: Display the first display page in response to the entry to the first display page being triggered. For example, the first display page may be displayed in response to the link to the first display page being triggered in the online document page.

The entry to the first display page may be a link to an object, may be a picture, text, a key, or the like associated with the link to an object. This is not limited in this disclosure. The object may be any content item suitable for displaying in a page. The computer device maintains a display state of the online document page during the display of the first display page. The maintaining the display state of the online document page may be understood as: the online document page always exists during the display of the first display page. For example, during the display of the first display page, the online document page may be displayed in the computer device in a half-screen form, a semi-transparent form, or the like, or may be hidden (not displayed in the computer device). When returning to the online document page, the computer device may directly display the online document page that always exists without reloading. From the perspective of running in background, the maintaining the display state of the online document page means that during the display of the first display page, the computer device maintains a process (or a thread) corresponding to the online document page running. For example, during the display of the first display page, maintaining the display state of the online document page allows input to the online document page to be processed through the maintained process or thread corresponding to the online document page.

The first display page supports a virtual resource transfer operation, to be specific, a recommended content receiver may directly transact (such as purchasing an item, paying an order, giving a gift) in the first display page. Specifically, the computer device displays a resource transfer result in the first display page in a case that a resource transfer operation (such as an item purchase operation, a payment operation) in the first display page is detected. In a specific implementation, the first display page includes a resource transfer entry (such as a "purchase" key and a "giving a gift" key), and the resource transfer entry is used for transferring a resource (such as purchasing an item, paying an order, giving a gift) in the first display page. The computer device displays order information (such as transaction information about a target object) in the first display page in response to the resource transfer entry in the first display page being triggered. Further, the computer device displays the resource transfer result in the first display page in a case that the order information is confirmed.

In an aspect, the computer device displays the first display page on an upper layer of the online document page in response to the entry to the first display page being triggered (such as the recommended content receiver clicks on the entry to the first display page).

Figure 4B:
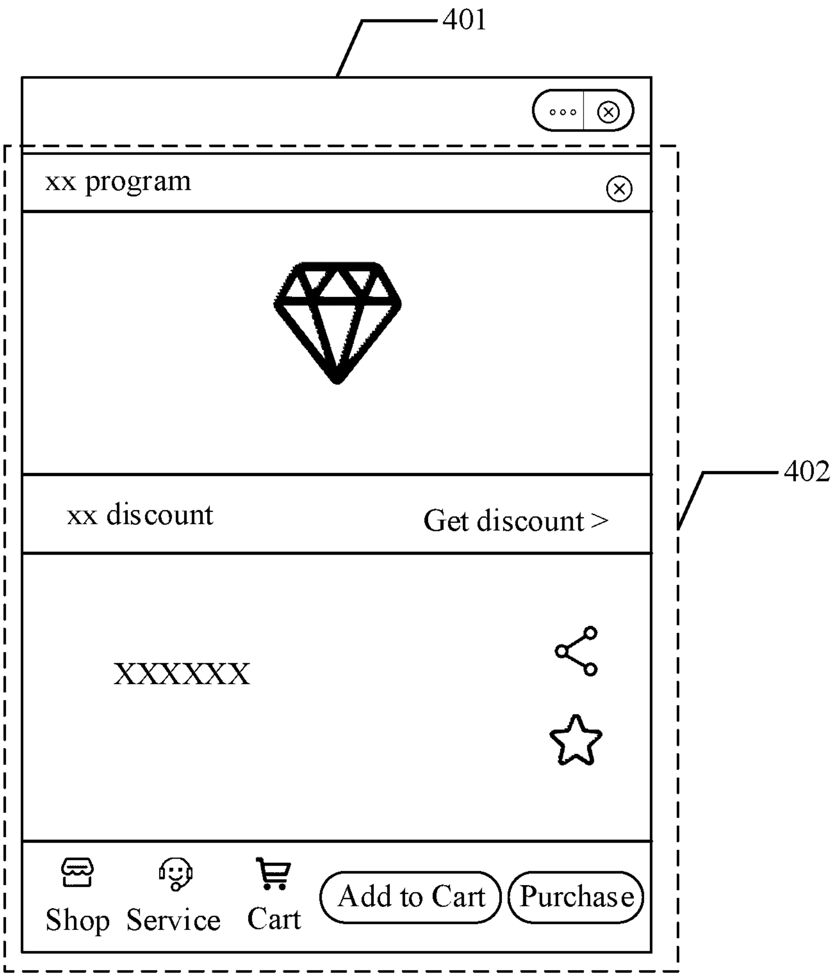
FIG. 4*b* is a schematic diagram of a display manner according to an aspect of this disclosure.

FIG. 4*b* is a schematic diagram of a display manner according to an aspect of this disclosure. As shown in FIG. 4*b*, the computer device displays a first display page 402 on the upper layer of the online document page 401. The first display page 402 may include a product picture, discount information, a share key, a favorite key, a store key, a customer service key, a cart key, and a transaction key. In a specific implementation, content in the first display page 402 may be set by a third-party platform based on an actual need. This is not limited in this disclosure.

In an aspect, the computer device displays the first display page in a target area of the upper layer of the online document page in response to the entry to the first display page being triggered.

Figure 4C:
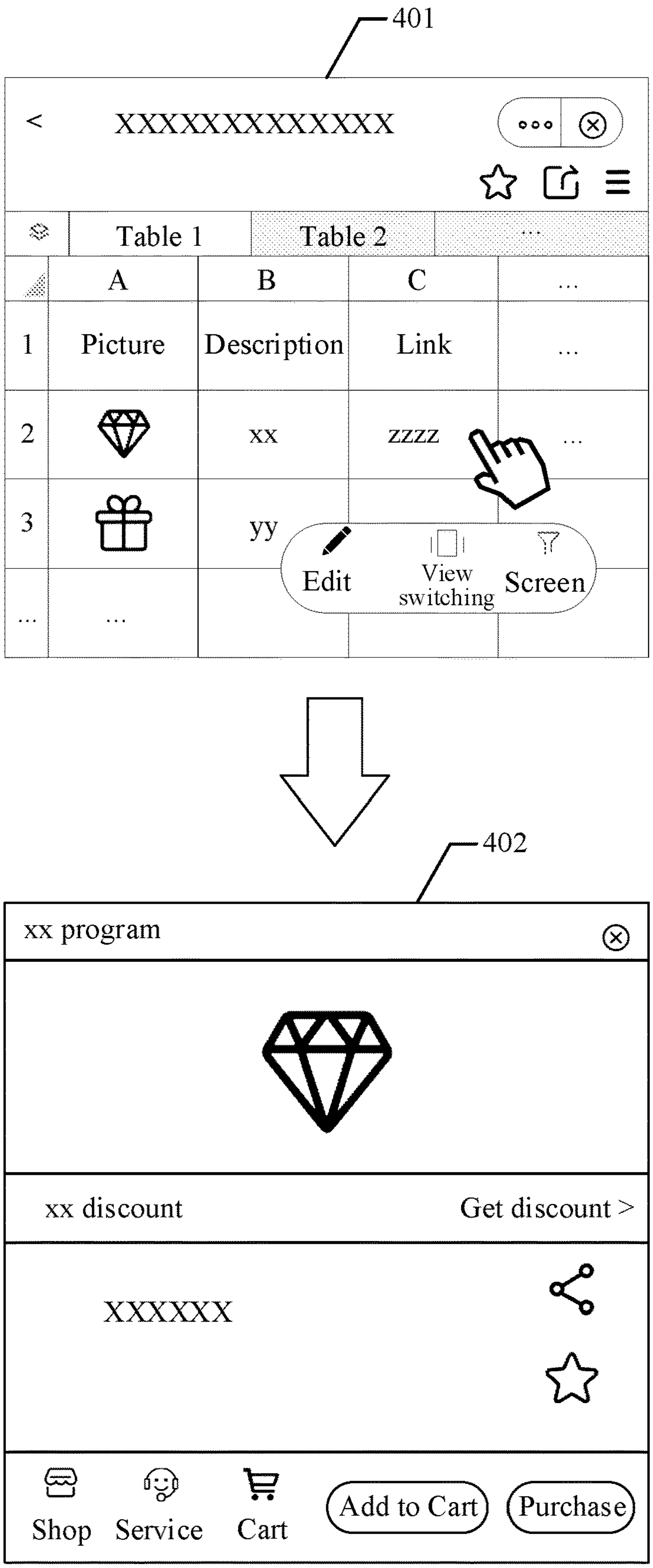
FIG. 4*c* is a schematic diagram of displaying a first display page in a target area of an upper layer of an online document page according to an aspect of this disclosure.

The target area may completely cover the online document page. FIG. 4*c* is a schematic diagram of displaying a first display page in a target area of an upper layer of an online document page according to an aspect of this disclosure. As shown in FIG. 4*c*, the first display page 402 is displayed in a case that the entry (such as a link) to the first display page is triggered. In this case, the first display page 402 completely covers the online document page 401. Although the computer device does not display the online document page 401 during the display of the first display page 402, a display state of online document page 401 is still maintained. It may be understood that a process (or a thread) corresponding to the online document page 401 still runs in background. Further, in a case that the first display page 402 satisfies a removal condition, the computer device removes the first display page 402 from the upper layer of the online document page 401 and displays the online document page 401. Because the display state of the online document page 401 is maintained during the display of the first display page 402, the online document page 401 may be displayed directly (without reloading) in a case that the first display page 402 is removed.

Figure 4D:
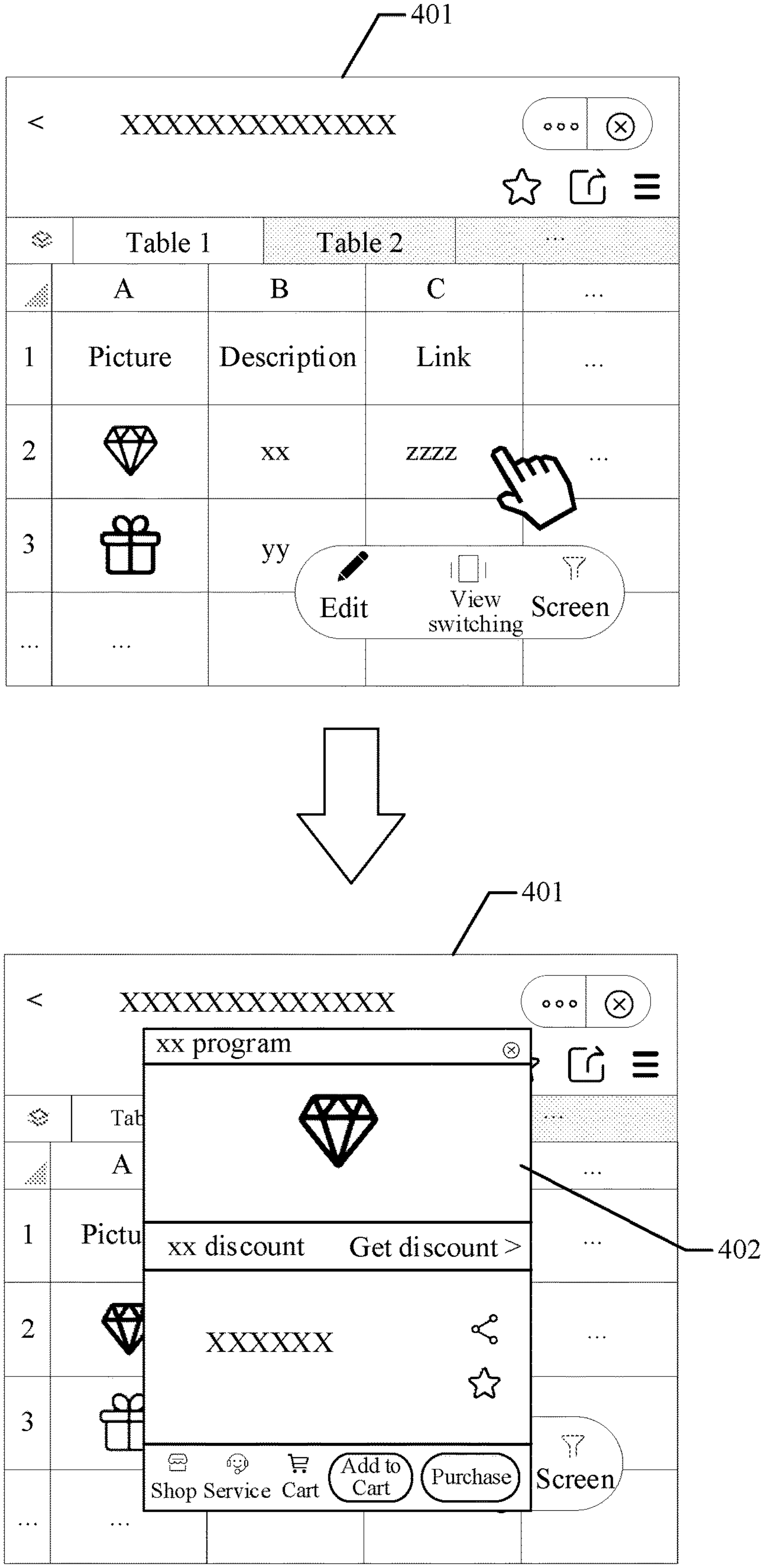
FIG. 4*d* is another schematic diagram of displaying a first display page in a target area of an upper layer of an online document page according to an aspect of this disclosure.
Figure 4E:
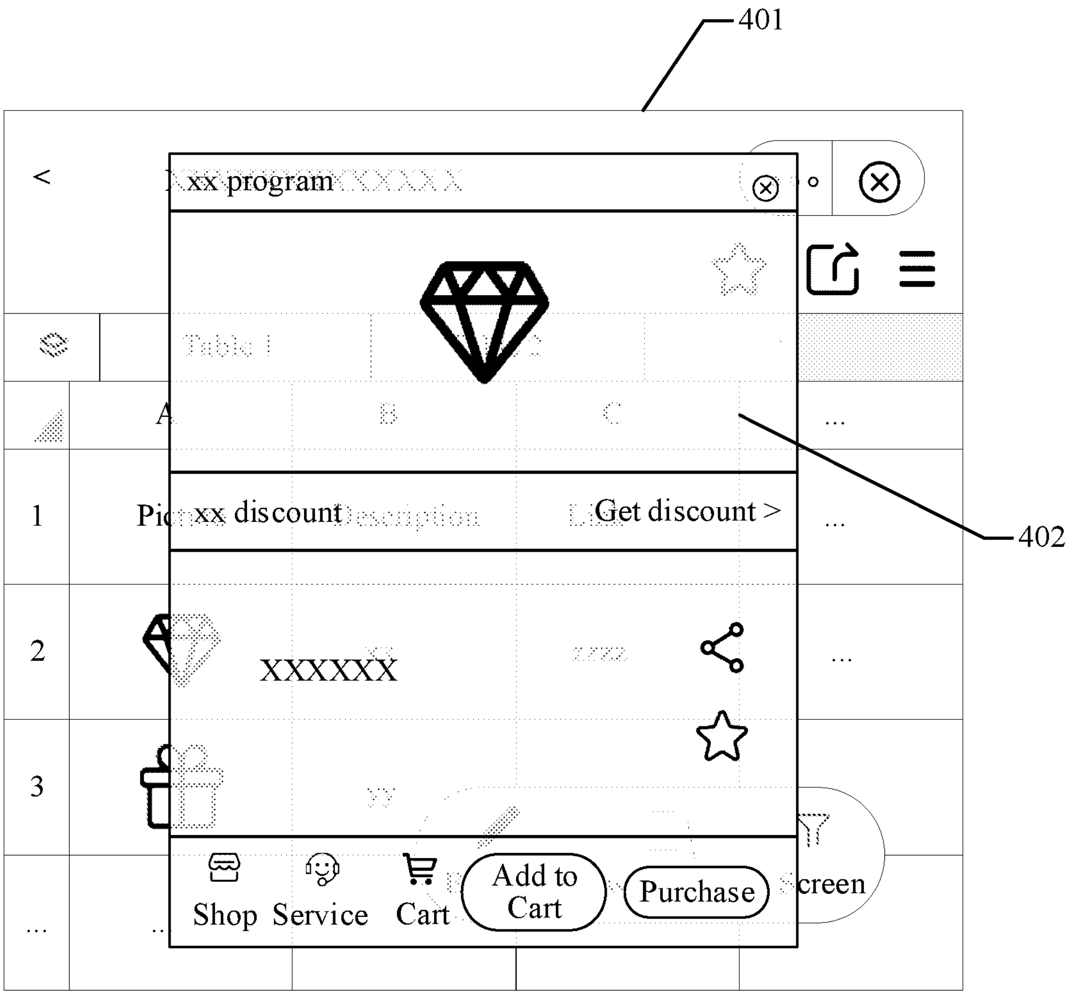
FIG. 4*e* is still another schematic diagram of displaying a first display page in a target area of an upper layer of an online document page according to an aspect of this disclosure.

The target area may alternatively partially cover the online document page, for example, the first display page is displayed on the upper layer of the online document page in a form of a floating window. FIG. 4*d* is another schematic diagram of displaying a first display page in a target area of an upper layer of an online document page according to an aspect of this disclosure. As shown in FIG. 4*d*, the first display page 402 is displayed in a preset area (that is, the target area) of the upper layer of the online document page 401 in a case that the entry (such as a link) to the first display page is triggered, and a scale of the preset area may be flexibly adjusted according to an actual need. This is not limited in this disclosure. It may be understood that during the display of the first display page 402, the display state of the online document page 401 is maintained (partially displayed in the computer device).

It may be understood that, in a case that the target area partially covers the online document page, for example, in a case that the first display page is displayed on the upper layer of the online document page in a form of a floating window (which does not completely cover the online document page), in response to a page moving operation, the first display page is moved from the target area to an area indicated by the page moving operation. In response to a page zooming operation, the first display page is zoomed to a scale indicated by the page zooming operation.

In one aspect, in a case that the target area partially covers the online document page (for example, and in a case that the first display page is displayed on the upper layer of the online document page in a form of a floating window (which does not completely cover the online document page)), a displayed part in the online document page 401 may be triggered. The computer device displays the complete online document page 401 (in this case, the first display 401 is triggered. Alternatively, relevant information about the content is displayed in the target area in case that the content displayed in the online document page 401 is triggered. For example, assuming that the content displayed in the online document page 401 is an entry to a display page of another object, the computer device displays the display page of the object in the target area.

In another aspect, the computer device displays the first display page on the upper layer of the online document page according to a preset transparency (such as a transparency of 15%) in response to the entry to the first display page being triggered. Specifically, the first display page is displayed in the target area of the upper layer of the online document page, and the target area may completely cover the online document page or partially cover the online document page. For details, refer to the previous aspect, this is not described herein again.

FIG. 4*c* is still another schematic diagram of displaying a first display page in a target area of an upper layer of an online document page according to an aspect of this disclosure. As shown in FIG. 4*c*, the computer device displays, in a form of a floating window, the first display page 402 on the upper layer of the online document page 401 according to a preset transparency in response to the entry to the first display page being triggered. It may be understood that, the first display page 402 may alternatively completely cover the upper layer of the online document page 401. A specific display manner is similar to FIG. 4*c*, this is not described herein again.

In another aspect, the computer device displays the online document page and the first display page in split screen in response to the entry to the first display page being triggered (such as the recommended content receiver clicks on the entry to the first display page). Specifically, the computer device may divide a screen into two independent display areas according to a preset scale and a preset rule, and display the online document page in one display area and display the first display page in the other display area.

Figure 4F:
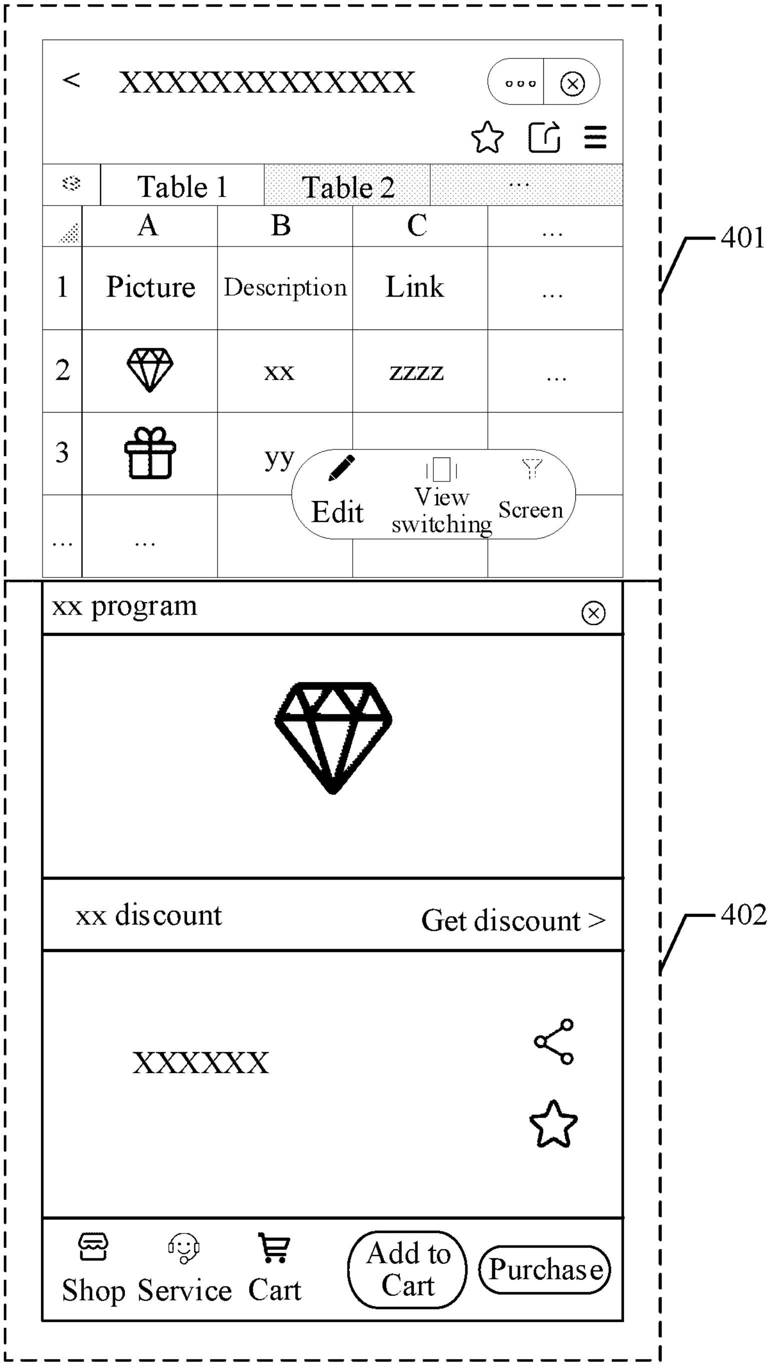
FIG. 4*f* is a schematic diagram of another display manner according to an aspect of this disclosure.

FIG. 4*f* is a schematic diagram of another display manner according to an aspect of this disclosure. As shown in FIG. 4*f*, the computer device displays the online document page 401 and the first display page 402 in split screen in response to the entry to the first display page being triggered. It may be understood that, the online document page 401 and the first display page 402 may also be displayed in split screen side by side. This is not limited in this disclosure.

Figure 4G:
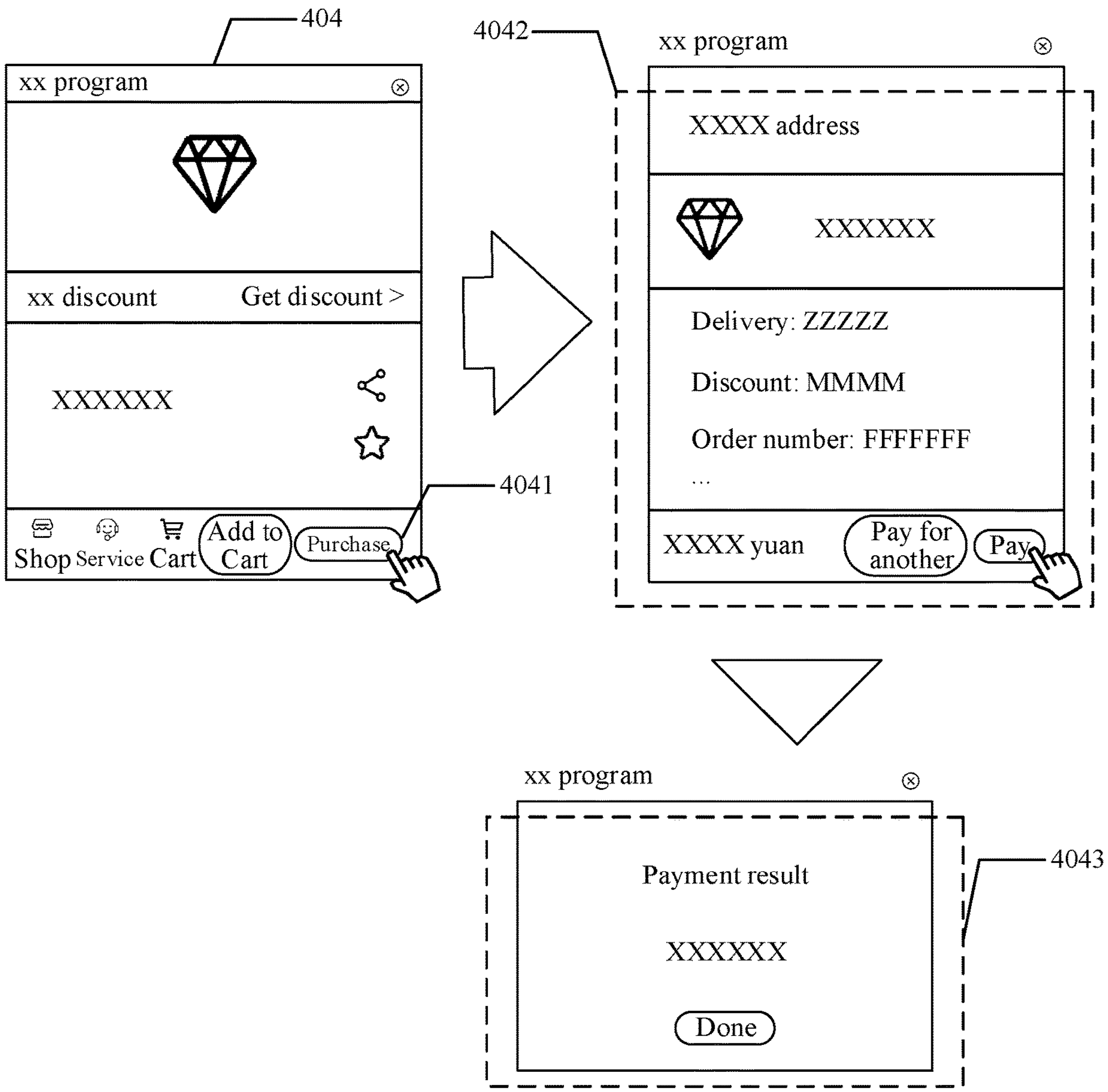
FIG. 4*g* is a schematic diagram of a transaction process according to an aspect of this disclosure.

Further, the first display page includes a resource transfer entry, the computer device displays order information in the first display page in response to the resource transfer entry being triggered, and the computer device displays a resource transfer result in a case that the order information is confirmed. FIG. 4*g* is a schematic diagram of a transaction process according to an aspect of this disclosure. As shown in FIG. 4*g*, the first display page is a product information display page 404. The product information display page 404 includes a transaction key 4041, in a case that the transaction key 4041 is triggered, the computer device displays order information 4042 corresponding to the product in the first display page, and in a case that the order information 4042 is confirmed (such as a recommended content receiver pays for the product), the computer device displays a transaction result 4043. Further, after a transaction is completed or after a page closing operation is detected, the computer device displays the online document page 401 as shown in FIG. 4*a*.

In one aspect, the first display page includes a multimedia playback window. In a case that the multimedia playback window being triggered is detected, the computer device plays multimedia content associated with the multimedia playback window. Alternatively, the first display page includes a download control corresponding to a target object. In a case that the download control being triggered is detected, the computer device displays a download process of a resource corresponding to the target object (such as a game, social software, audio and a video, and a picture).

S303: Display the online document page in response to the first display page satisfying a closing condition.

That the first display page satisfies a closing condition includes but not limited to: the recommended content receiver closes the first display page and a task in the first display page is completed. For example, the first display page is a shopping page, and in a case that the computer device detects that an order associated with the shopping page is completed, the first display page is determined to satisfy the closing condition. For another example, the first display page is a live streaming page, and in a case that the computer device detects that a live streaming in the live streaming page is ended, the first display page is determined to satisfy the closing condition. For another example, the first display page is a download page, and in case that the computer device detects that a resource in the download page is downloaded, the first display page is determined to satisfy the closing condition. For another example, the first display page is a multimedia playback page, and in a case that the computer device detects that playback of the multimedia resource in the multimedia playback page is completed, the first display page is determined to satisfy the closing condition.

In an implementation, the first display page is displayed on the upper layer of the online document page. In a case that the first display page satisfies the closing condition, the computer device removes the first display page from the upper layer of the online document page and displays the online document page.

In another implementation, the first display page and the online document page are displayed in split screen. In a case that the first display page satisfies the closing condition, the computer device closes the first display page and displays the online document page. For example, the online document page is displayed in full screen, or the online document page is displayed in a manner before the split-screen display.

It may be understood that because the computer device maintains the display state of the online document page during the display of the first display page, there is no need to reload the online document page in a case that the first display page is closed to display the online document page.

S304: Update content displayed in the online document page in response to the online document page satisfying a content update condition.

That the online document page satisfies a content update condition includes at least one of the following: a refresh operation of the online document page is detected; that the content in the online document page is updated is detected; and that a current moment matches update time of the online document page is detected.

In an implementation, the online document page is associated with N editors having editing permissions, and N is a positive integer. Content in an online document page corresponding to each editor is at least partially different. Online document pages corresponding to M editors among the N editors include the same first content item, and M is a positive integer less than or equal to N. The first content item may be any content suitable for displaying in the online document page. The computer device updates the first content item to an edited content item in a case that the computer device detects an editing operation on the first content item by any one of the M editors. It may be understood that, the computer device also simultaneously updates the first content item to an edited content item in a case that a computer device used by other M−1 editors other than the current computer device detects the editing operation on the first content item by any one of the M editors. For the remaining N−M editors having the editing permissions, the online document page remains unchanged.

Specifically, the editing operation may include a recommendation operation. In an aspect, the computer device performs highlighting on the first content item in a case that a recommendation operation on the first content item by any one of the M editors is detected. The highlighting includes at least one of the following: highlight display, color switching display, bold display, font change display, and pin display. For an online table, the highlighting may further include but is not limited to: increasing a height or width of a cell where the first content item is located, and flashing the cell where the first content item is located.

In another aspect, in a case that a recommendation operation on the first content item by any one of the M editors is detected, the computer device generates an information display window and displays relevant information about recommended first content item in the information display window. The relevant information about the recommended first content item includes at least one of the following: recommender information, a number of views, a number of favorites, a number of shares, a number of purchases, a number of downloads, a number of views, a transaction entry, a download entry, a playback entry, and the like.

Figure 4H:
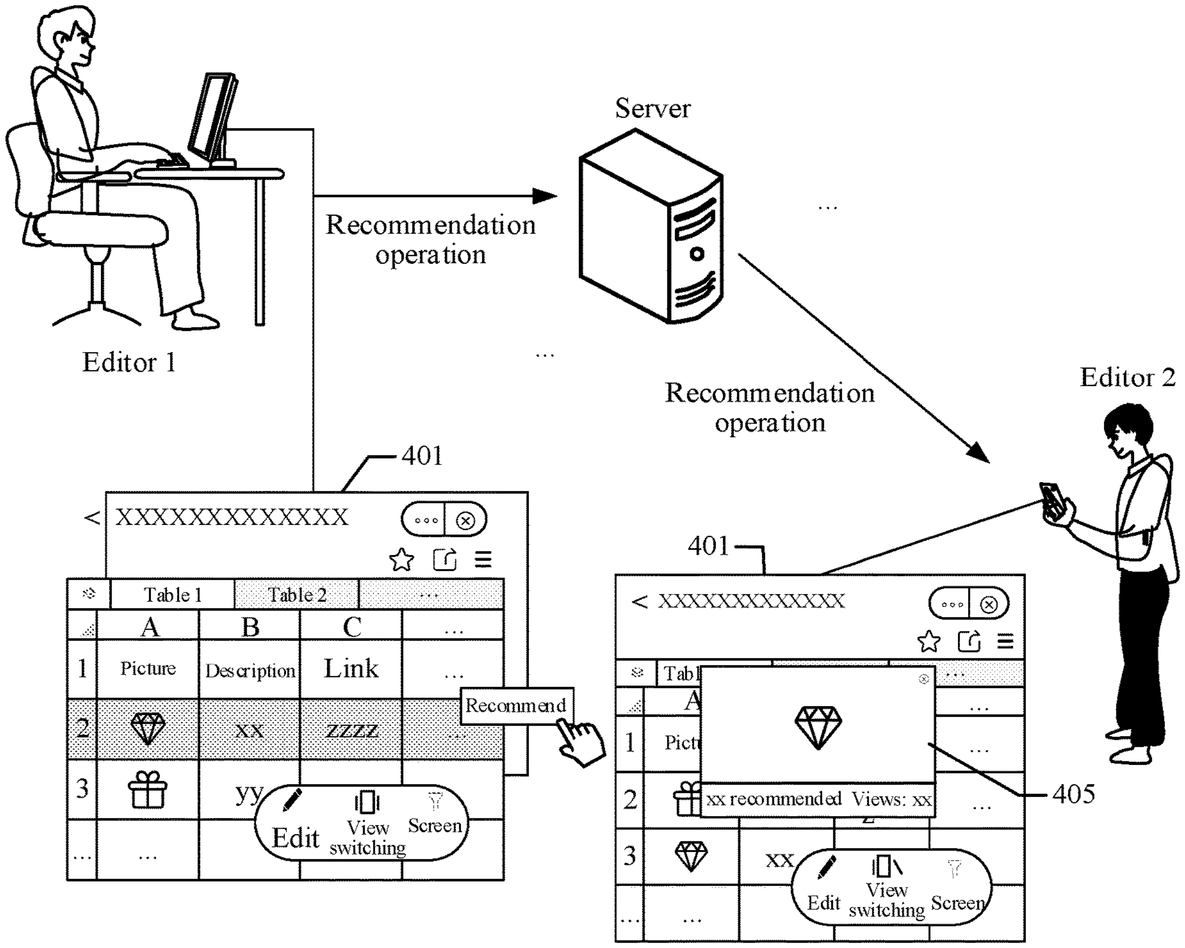
FIG. 4*h* is a schematic diagram of triggering an information display window according to an aspect of this disclosure.

FIG. **4*h* is a schematic diagram of triggering an information display window according to an aspect of this disclosure. As shown in FIG. 4*h*, an information display window 405 is generated in a case that an editor 1 recommends an object in a second row of an online table (that is, the first content item) and a computer device used by an editor 2 detects a recommendation operation on the first content item by the editor 1, and a picture of the recommended object (that is, the first content item), an identifier of a recommender, and a number of views of the object are displayed in the information display window 405. It may be understood that because content in an online document page of each editor is different, the object in the second row of the online table of the editor 1 may be displayed in a second row of an online table of the editor 2, or may not be displayed in the second row of the online table of the editor 2. This is not limited in this disclosure. Further, the editor 2 may further perform a moving operation, a closing operation, and the like, on the information display window 405**.

Taking an application scenario as an example, a computer device of an editor of the first content item may be a computer device of a livestreamer. In a case that the computer device of a livestreamer needs to recommend a target product, the target product may be selected and recommended by using a recommendation key. In a case that the target product is recommended by the computer device of the livestreamer, a computer device that includes recommended content receiver of the target product in the online document page performs highlighting on relevant content of the target product, or displays an information display window of the target product, and displays relevant information about the target product (such as a product picture, a price, a sales volume, a number of favorites, a number of shares) in the information display window of the target product.

In another implementation, the online document page includes the first content item, the online document page is associated with N editors having editing permissions, and Nis a positive integer. Content in an online document page corresponding to each editor is at least partially different. Online document pages corresponding to M editors among the N editors include the first content item, and M is a positive integer less than or equal to N. In a case that the computer device detects an editing operation on the first content item by any one of the M editors, prompt information indicating that the first content item is edited is displayed. It may be understood that, in a case that a computer device used by other M−1 editors other than the current computer device detects the editing operation on the first content item by any one of the M editors, the computer device also simultaneously displays the prompt information indicating that the first content item is edited. For the remaining N-M editors having the editing permissions, the online document page remains unchanged.

Specifically, the editing operation includes but is not limited to a favorite operation and a sharing operation. For an online shopping scenario, the favorite operation may also refer to an operation of adding to a cart. In an aspect, the editing operation is used as a favorite operation. In a case that the computer device detects a favorite operation on the first content item by any one of the M editors, prompt information indicating that the first content item is favorited is displayed. The prompt information indicating that the first content item is favorited includes at least one of the following: an identity of a user who makes favorites, a number of favorites of the first content item, a number of views of the first content item. In another aspect, in a case that the computer device detects a sharing operation on the first content item by any one of the M editors, prompt information indicating that the first content item is shared is displayed. The prompt information indicating that the first content item is shared includes at least one of the following: an identity of a sharer, a number of shares of the first content item, a number of views of the first content item.

Figure 4I:
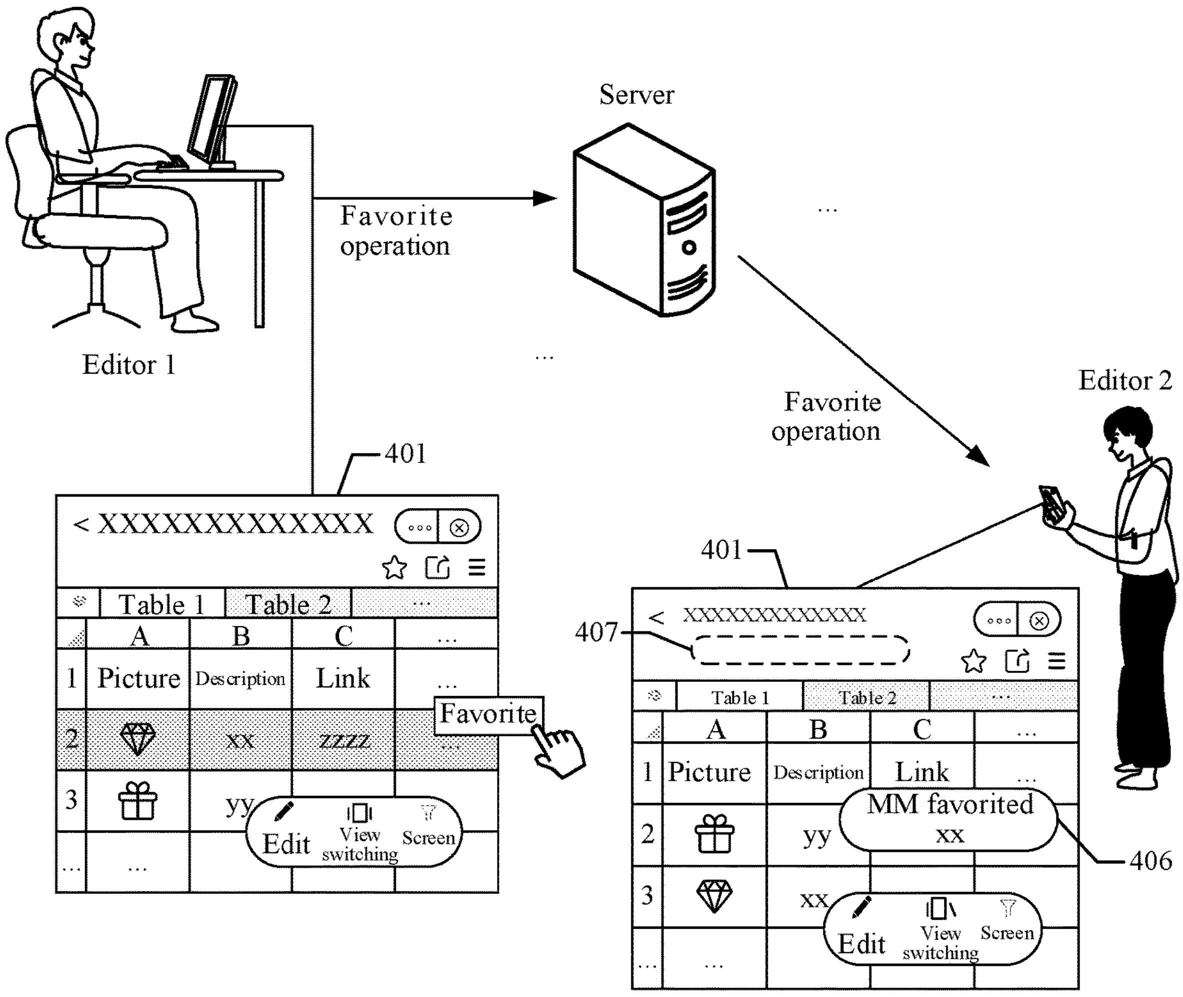
FIG. 4*i* is a schematic diagram of triggering prompt information according to an aspect of this disclosure.

FIG. 4*i* is a schematic diagram of triggering prompt information according to an aspect of this disclosure. As shown in FIG. 4*i*, in a case that an editor 1 favorites an object in a second row of an online table (that is, a first content item), in a case that a computer device used by an editor 2 detects a favorite operation on the first content item by the editor 1, prompt information 406 indicating that the first content item is favorited is displayed. The prompt information 406 includes an identity of a user who makes favorites. A display position of the prompt information 406 is only for example. This is not limited in this disclosure. For example, the prompt information 406 may alternatively be displayed at a position 407. Further, the editor 2 may further perform a moving operation, a closing operation, and the like, on the prompt information 406.

In yet another implementation, the online document page is associated with N recommended content receivers, and N is a positive integer. Recommend content in an online document page corresponding to each recommended content receiver is at least partially different. Online document pages of M recommended content receivers among the N recommended content receivers include the entry to the first display page, and M is a positive integer less than or equal to N. The first display page is associated with a task. For example, for an online shopping page, the task associated with the page refers to whether a product in the online shopping page is placed an order. For a multimedia playback page, the task associated with the page refers to whether a multimedia resource in the multimedia playback page is played. For a resource download page, the task associated with the page refers to whether a network resource in the resource download page is downloaded. The computer device displays task completion information in response to a task associated with the first display page in any one of the M recommended content receivers being completed. For the online shopping page, that the task associated with the first display page is completed may be understood as that a product in the online shopping page is placed an order. For the multimedia playback page, that the task associated with the first display page is completed may be understood as that a multimedia resource in the multimedia playback page is played. For the resource download page, that the task associated with the first display page is completed may be understood as that a network resource in the resource download page is downloaded. The task completion information includes any one of the following: resource transfer information (such as an identity of a purchaser and a quantity of orders), playback information (such as cumulative playback volume), and download information. For the remaining N-M recommended content receivers, a currently displayed page (such as the online document page, the first display page) remains unchanged.

Figure 4J:
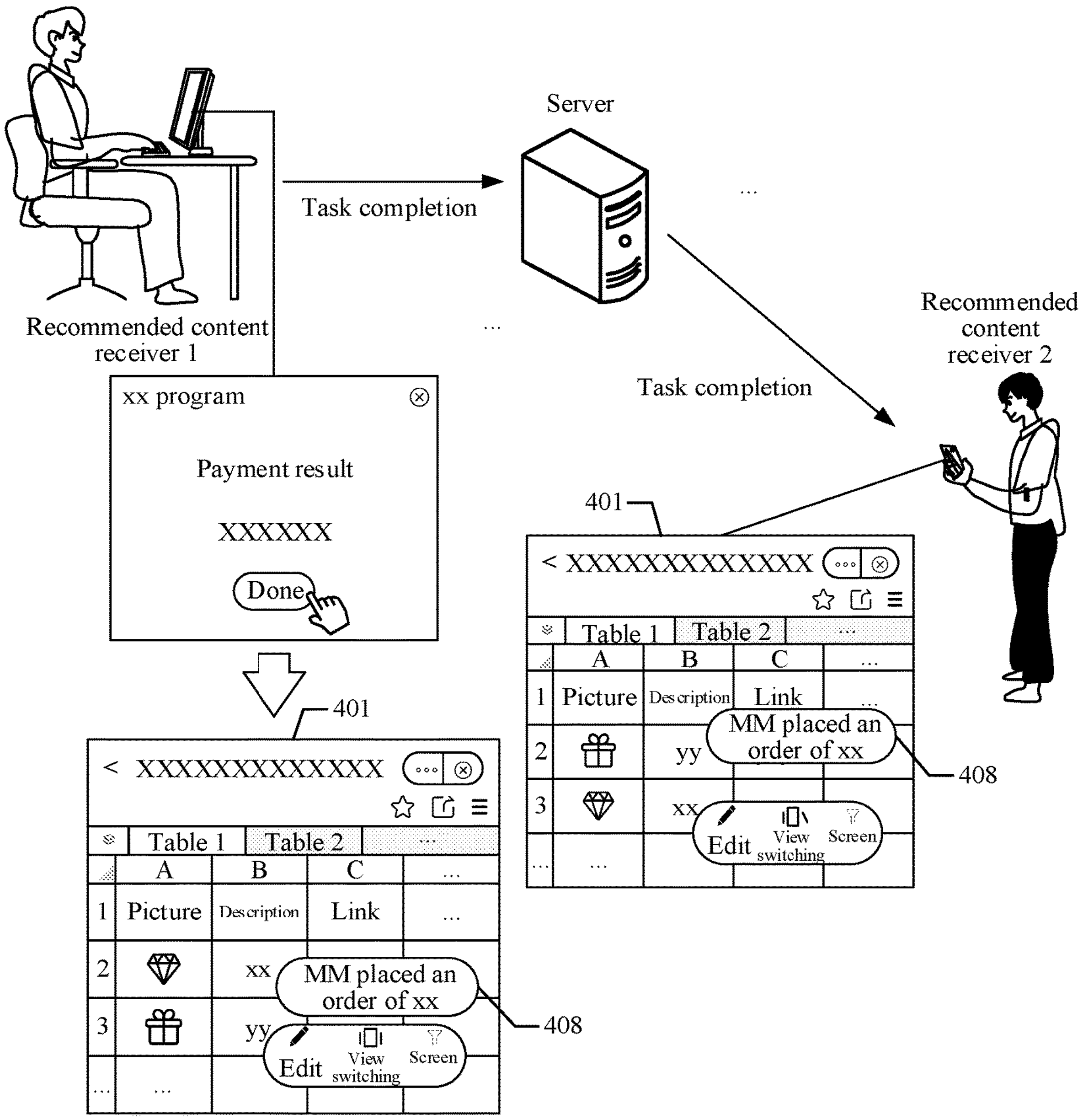
FIG. 4*j* is a schematic diagram of triggering task completion information according to an aspect of this disclosure.

FIG. 4*j* is a schematic diagram of triggering task completion information according to an aspect of this disclosure. As shown in FIG. 4*j*, in a case that a recommended content receiver 1 completes a transaction associated with the first display page, a computer device used by a recommended content receiver 2 detects that a task associated with the first display page is completed, and displays task completion information 408. The task completion information 408 includes an identity of a user who completes the task. A display position and display form of the task completion information 408 are only for example. This is not limited in this disclosure. For example, the task completion information 408 may further be displayed in a form of a floating window, a sub-page, and the like. Further, the recommended content receiver 2 may further perform a moving operation, a closing operation, and the like, on the task completion information 408. It may be understood that if a page currently displayed by the recommended content receiver 2 is the first display page, the task completion information 408 may be displayed in the first display page in a manner similar to the task completion information 408 displayed in the online document page 401. This is not described herein again.

In one aspect, the online document page is associated with N recommended content receivers, and N is a positive integer. Recommend content in an online document page corresponding to each recommended content receiver is at least partially different. Online document pages of M recommended content receivers among the N recommended content receivers include the entry to the first display page, and M is a positive integer less than or equal to N. The first display page is associated with a task. Task completion information is displayed on computer devices of the N recommended content receivers in response to a task associated with the first display page in any one of the M recommended content receivers being completed. The task completion information may be used as the entry to the first display page. A recommended content receiver not including the entry to the first display page among N-M online document pages may enter the first display page by triggering the task completion information.

In still another implementation, the third-party platform updates recommended content and sends the updated recommended content to the server by using the document development interface, so that the server automatically generates a new online document based on the updated recommended content and sends the new online document to the computer device. The computer device may update the online document page immediately after obtaining the new online document, or the computer device may update the online document page at a preset moment. It may be understood that the recommended content corresponding to different recommended content receivers is at least partially different, therefore, the updated online document page of each recommended content receiver is also at least partially different.

Step S304 may be performed before step S302 or step 303, or may be simultaneously performed with step S302 or step 303. This is not limited in this disclosure.

In this aspect of this disclosure, the online document page is displayed, and the entry to the first display page is displayed in the online document page. The first display page is displayed in response to the entry to the first display page being triggered. During the display of the first display page, the display state of the online document page is maintained. It may be learned that by maintaining the display state of the online document page during the display of the first display page, the online document page may be directly displayed when exiting the first display page. This improves convenience for accessing a page. In addition, the online document may further be operated by using various controls (such as a view switching control and a screening control). This improves convenience for editing the online document. By using upper-layer display, split-screen display, and another manner, a page may be displayed more flexible. This further improves convenience for accessing a page.

Figure 5:
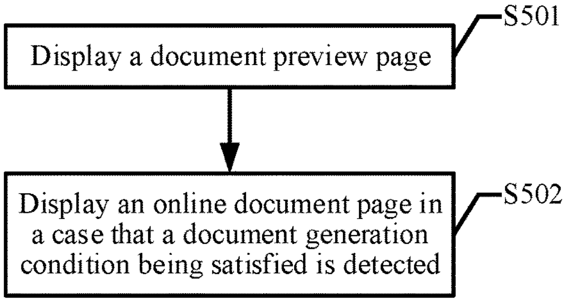
FIG. 5 is a flowchart of still another page processing method according to an aspect of this disclosure.

FIG. 5 is a flowchart of still another page processing method according to an aspect of this disclosure. The page processing method may be performed by a computer device that may be the third-party platform 102 shown in FIG. 1. As shown in FIG. 5, the page processing method may include step S501 and step S502:

S501: Display a document preview page. For example, the document preview page includes a document template of an online document.

The document preview page displays a document template of an online document. The document template may include a preset document format, a preset font, and the like. The document template may alternatively be a blank online document. Further, the document preview page may include an entry (such as a thumbnail) to at least one candidate document template. The computer device switches and displays the document template in the document preview page to a target document template corresponding to the entry to a target candidate document template, in response to an entry to a target candidate document template being triggered. The entry to the target candidate document template may be one of the entries to at least one candidate document template.

In an implementation, in a case that an editing operation on the document template in the document preview page is detected, the computer device displays the updated document template based on the editing operation. For example, in a case that an administrator of the third-party platform adjusting a font in the document template is detected, the computer device updates and displays the font in the document template as an adjusted front.

S502: Display an online document page in a case that a document generation condition being satisfied is detected. For example, when a document generation condition is satisfied, an online document page that is generated based on the document template and based on recommendation information is displayed. The online document page includes a link to a first display page that corresponds to at least one recommended object in the recommendation information and includes a resource transfer operation.

That a document generation condition is satisfied may be that the document template in the document preview page is confirmed. The online document page is generated based on the document template. The online document page displays an entry to a first display page. The first display page belongs to an installation-free application. The installation-free application may be an application developed by the third-party platform, or may be an application developed by another platform.

In an implementation, the first display page supports a virtual resource transfer operation, to be specific, a recommended content receiver may directly transact in the first display page. For example, the recommended content receiver may purchase a product in the product display page in a case that the first display page is a product display page. For another example, in a case that the first display page is a live streaming page, the recommended content receiver may give a virtual gift to a livestreamer in the live streaming page, or place an order for a product recommended by the livestreamer.

In another implementation, the online document page is automatically generated based on the recommended content and the confirmed document template. The online document page is an online document for the recommended content receiver. In other words, one online document corresponds to one recommended content receiver. Specifically, the recommended content is for the recommended content receiver, in other words, one recommended content is for one recommended content receiver. Therefore, one online document corresponds to one recommended content receiver. It may be understood that in actual application, there may be a situation that online documents corresponding to at least two recommended content receivers are the same. This is not limited in this disclosure.

The computer device may display the online document page in the document preview page, or may display the online document page in the first display page. This is not limited in this disclosure.

In one aspect, the computer device displays an updated online document page based on the editing operation in a case that an editing operation for the online document page is detected. For example, in a case that an administrator of the third-party platform modifying content in the online document page is detected, the computer device updates and displays the content in the online document page as modified content.

In this aspect of this disclosure, different online document pages for different recommended content receivers are generated by using the document template and different recommended content for different recommended content receivers, to achieve an objective of personalized recommendations for different recommended content receivers, and then different content (that is, data content in the online document page) is generated and provided for computer devices of different content receivers with respect to the same access entry (for example, an access address of the online document page). This can improve convenience and efficiency of data processing, as well as convenience of providing different content to different users, thereby improving efficiency and accuracy of a recommendation.

Figure 6:
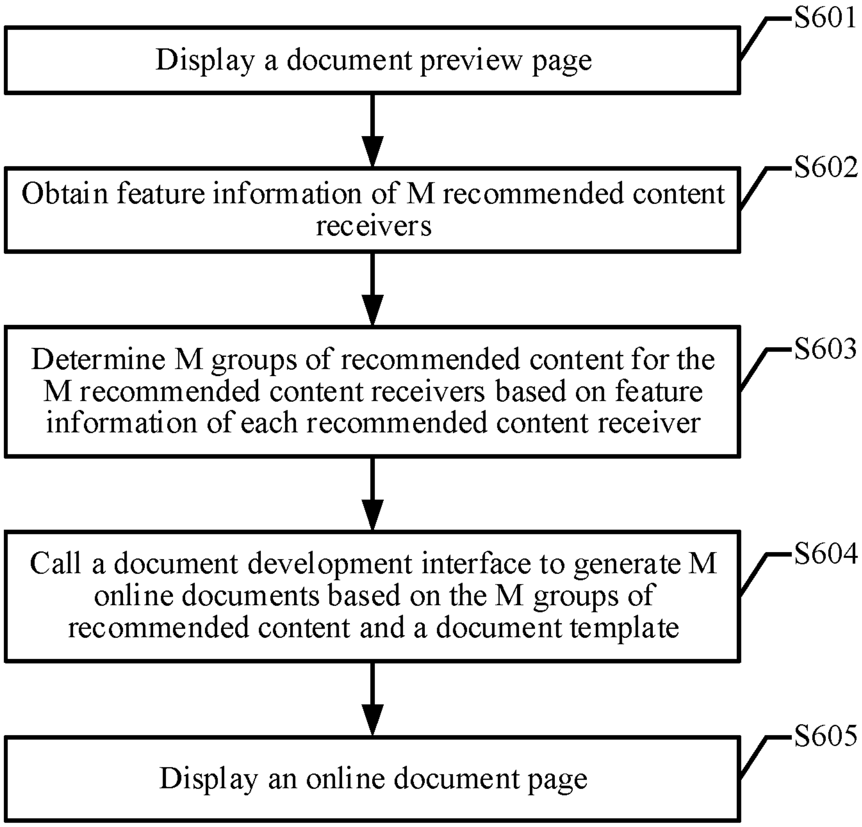
FIG. 6 is a flowchart of yet another page processing method according to an aspect of this disclosure.

FIG. 6 is a flowchart of yet another page processing method according to an aspect of this disclosure. The page processing method may be performed by a computer device that may be the third-party platform 102 shown in FIG. 1. As shown in FIG. 6, the page processing method may include step S601 to step S605:

S601: Display a document preview page.

The document preview page displays a document template of an online document. The document template may include a preset document format, a preset font, and the like.

In an implementation, the computer device obtains a developer credential. For example, the computer device provides identity certification information to a server, and the developer credential is obtained from the server in a case that the identity certification information is verified. After obtaining the developer credential, the computer device may call a document development interface (API) provided by the server using the developer credential to create a document template. After successful creation, the computer device may display the document preview page.

Further, the document preview page may include an entry (such as a thumbnail) to at least one candidate document template. The computer device switches and displays the document template in the document preview page to a document template corresponding to the entry to a candidate document template, in response to an entry to a candidate document template being triggered. The entry to the candidate document template may be one of the entries to at least one candidate document template.

In one aspect, candidate recommended content includes a plurality of types. After the document template in the document preview page is confirmed, the computer device may display P candidate recommendation types, and P is a positive integer. The computer device continues to perform step S602 in response to at least one recommendation type among the P candidate recommendation types being selected. In simple terms, an administrator of the third-party platform may use the P candidate recommendation types to set a range of recommended content to be recommended to M recommended content receivers. For example, only a clothing type is recommended, only a furniture type is recommended, or the like.

S602: Obtain feature information of M recommended content receivers.

In an implementation, after obtaining authorizations of the M recommended content receivers, the computer device may obtain historical behavior records and relevant information (such as friend information, a personal preference set by a user) about the M recommended content receivers, and perform feature extraction on the historical behavior records and relevant information about the M recommended content receivers, to obtain the feature information of the M recommended content receivers.

S603: Determine M groups of recommended content for the M recommended content receivers based on feature information of each recommended content receiver.

A recommended content receiver corresponds to a group of recommended content, and each group of recommended content is at least partially different. It may be understood that if feature information of two recommended content receivers is consistent or similar, recommended content corresponding to the two recommended content receivers may be the same.

In an implementation, the computer device may screen out M groups of recommended content for the M recommended content receivers from a candidate content library based on the feature information of the M recommended content receivers. Alternatively, the computer device may screen out M groups of recommended content for the M recommended content receivers from a candidate content library based on the feature information of the M recommended content receivers and a selected recommendation type.

S604: Call the document development interface to generate M online documents based on the M groups of recommended content and the document template.

The document development interface is a set of interfaces provided by the server to the third-party platform, to automatically generate the online document based on recommended content. The document development interface may use hypertext transfer protocol secure (HTTPS), and the third-party platform may operate the online document by using the document development interface in a case that the authorization is obtained. In a specific implementation, an open authorization (OAuth 2.0) protocol may be used for identity verification and obtaining the authorization, to ensure data security. The document development interface may include a file management interface and a content editing interface. The third-party platform may create a new online document, rename an online document, and set an access permission to an online document by using the file management interface. The third-party platform may perform operations such as viewing and editing on content of the online document by using a content editing interface. In addition, the third-party platform may further achieve a function of inserting promotional product information by calling a relevant interface.

Figure 7:
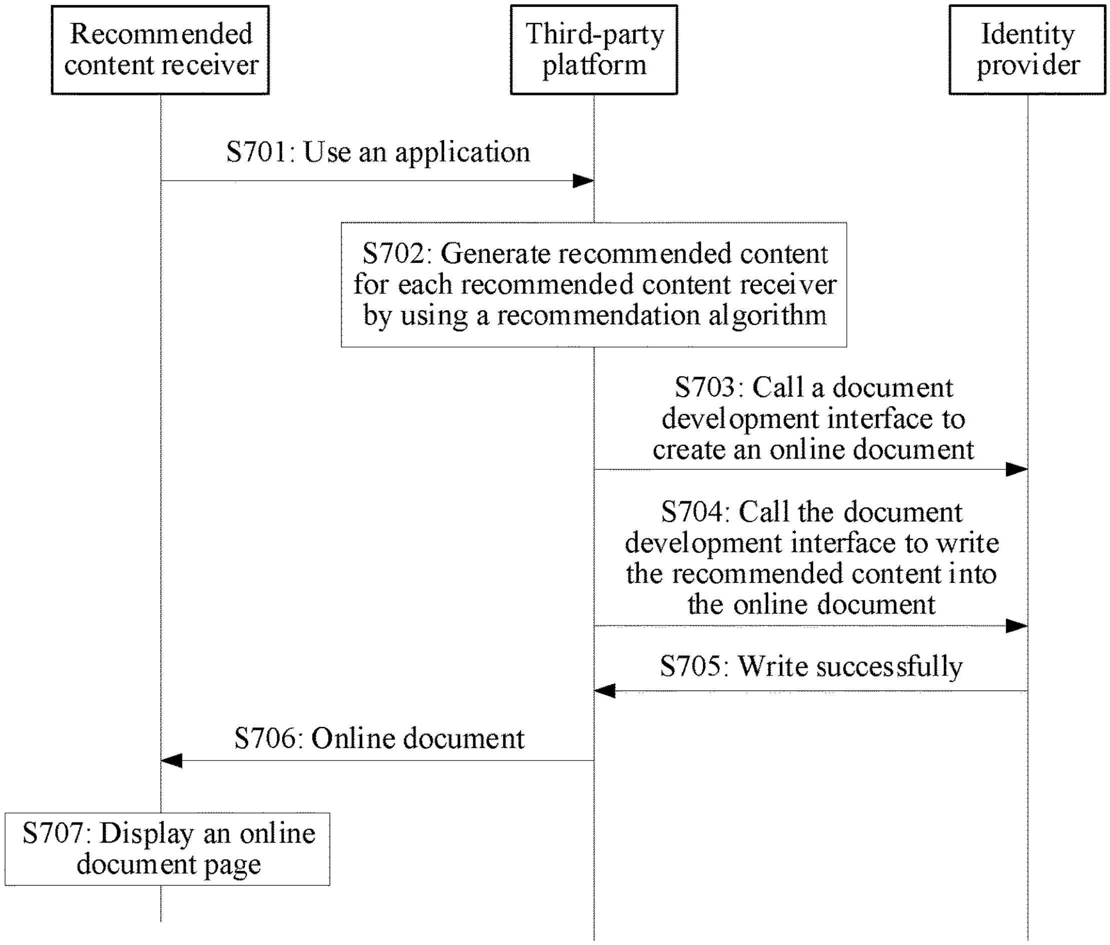
FIG. 7 is a flowchart of calling a document development interface according to an aspect of this disclosure.

FIG. 7 is a flowchart of calling a document development interface according to an aspect of this disclosure. As shown in FIG. 7:

S701: A recommended content receiver uses an application developed by a third-party platform.

S702: After obtaining an authorization of the recommended content receiver, the third-party platform obtains historical behavior records and relevant information about the recommended content receiver, and performs feature extraction on the historical behavior records and relevant information about the recommended content receiver, to obtain feature information of the recommended content receiver, then determines personalized recommended content corresponding to each recommended content receiver by using a recommendation algorithm (such as a collaborative filtering algorithm).

S703: The third-party platform creates an online document by using the document development interface. During the creation, the third-party platform may perform an operation on a relevant attribute of the online document, for example, rename the online document, determine a document template corresponding to the online document.

S704: The third-party platform calls the document development interface, to generate an online document for each recommended content receiver based on recommended content corresponding to each recommended content receiver.

S705: The third-party platform obtains an online document generation result, and the online document generation result may include the generated online document.

S706: The third-party platform pushes an entry to the online document to each recommended content receiver.

S707: In a case that the recommended content receiver triggers the entry to the online document, display an online document page for the recommended content receiver on a terminal device used by the recommended content receiver.

In an implementation, each group of recommended content includes object information about at least one object. The computer device writes, according to the document template, object information in a group of recommended content into an online document corresponding to the group of recommended content. For example, the object information includes a picture and text, the document template is a table, and each row of the table is used for writing object information of an object, cells in a first column of each row are used for writing pictures, and cells in a second column of each row are used for writing text. The object information may be annotated with a picture and text by using a preset identifier (such as a preset field). After obtaining a group of recommended content, a server writes pictures of objects into cells in a first column of a row to which the objects belong and writes text of the objects into cells in a second column of the row to which the objects belong, to obtain the online document corresponding to the group of recommended content.

In a specific implementation, object information about an object includes introduction information and an access path of the object. After obtaining M groups of recommended content from the document development interface, the server writes, according to the document template, introduction information of objects in a group of recommended content into an online document corresponding to the group of recommended content. In addition, the server generates, based on an access path of an object, an entry to a display page corresponding to the object (such as performing address conversion on the access path of the object), and writes the entry to a display page corresponding to the object into an online document corresponding to recommended content to which the object belongs, to obtain M online documents corresponding to M groups of recommended content.

S605: Display an online document page.

The online document page is a page of one online document among M online documents. For a specific implementation of step S605, refer to the implementation of step S502 in FIG. 5. This is not described herein again.

Figure 8:
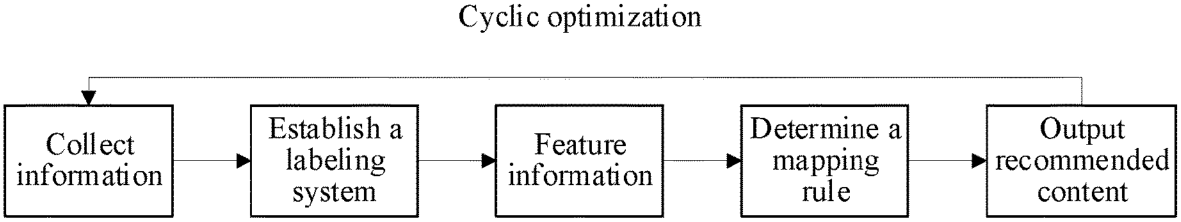
FIG. 8 is a schematic diagram of online document page processing according to an aspect of this disclosure.

FIG. 8 is a schematic diagram of online document page processing according to an aspect of this disclosure. As shown in FIG. 8, a third-party platform may be an e-commerce platform. After obtaining an authorization from a recommended content receiver (such as a user), the third-party platform collects relevant information about a user and product, to provide support for underlying data. In addition, the third-party platform may establish a multi-dimensional (such as a user, a product, a channel) labeling system, to provide a basis for a mapping relationship. Further, the third-party platform may determine feature information of the user based on a label, to provide the user with a specific service based on the feature information of the user. The third-party platform determines a mapping rule by using a label, and the mapping rule is used for determining recommended content corresponding to each user (in other words, recommended content for different users is determined by using a label). The third-party platform outputs personalized recommended content for different users by using a recommendation algorithm, and generates an online document by using a document development interface, then returns to an information collection process again for cyclic optimization.

FIG. 9 is a schematic diagram of another online document page processing according to an aspect of this disclosure. As shown in FIG. 9, in a third-party platform, a personalized recommendation algorithm continuously interacts with a user library and a content pool, to automatically output personalized recommended content for different users. The third-party platform calls a document development interface to generate different online documents for different users and pushes the online document (such as using a social channel and a news channel). An online document page for the target user is displayed in a case that a terminal device of a target user detects that an entry to an online document is triggered. Based on the page processing method in FIG. 2 or FIG. 3, efficiency for accessing a page may be improved. Taking online shopping as an example, a user may shop efficiently based on an online document page. Specifically, the user may trigger an entry to a display page of an object and enter a shopping page to purchase a product. After completing a payment, the user may close the display page of the object and return to the online document page (without reloading) to continue shopping.

The following uses a complete example to illustrate the page processing method provided in the disclosure:

A developer of the third-party platform provides identity certification information to a server, and obtains a developer credential (such as an identity identifier (APPID) and an identity key (APPKEY)) provided by the server after passing identity verification (or completing registration). The third-party platform may create a blank online document (or create an online document template) by using the developer credential, and then generate recommended content for each user by using a recommendation algorithm. For example, the recommended content may include product information, introduction text, and a link to a corresponding product. The link has an ID, a path, and another information of a target application stored therein. Then, the document development interface is called to generate an online document for each user based on the recommended content for each user. For example, the recommended content for each user is inserted into a pre-created blank online document (or an online document template). For example, for an online table, corresponding product information to be promoted may be written by using an interface for batch updating content in a specified area. It may be understood that this process may be implemented by using a background interface without manual participation.

After preparing the online document, the third-party platform may recommend an entry to the online document to a user in communication manners, such as pushing and advertising. After the user triggers the entry to the online document, a terminal device of the user displays an online document page for the user. The online document page may include object information, introduction text, and an entry to a display page of an object (such as a mini program link). The terminal device of the user displays the first display page in a case that the user triggers an entry to a first display page, and maintains a display state of the online document page during the display of the first display page. Taking the first display page as a shopping page as an example, the user may add a product in a shopping cart, place an order, and the like, in the page. After closing the first display page, the user may directly return to the online document page (without reloading) and continue viewing another content in the online document page. By using the foregoing method, the third-party platform may programmatically package the foregoing process and generate different online documents for different recommended content for different users to implement batch and personalized promotion.

In this aspect of this disclosure, different online document pages for different recommended content receivers are generated by using the document development interface and different recommended content for different recommended content receivers, to achieve an objective of personalized recommendations for different recommended content receivers. This improves efficiency and accuracy of a recommendation.

The methods in aspects of this disclosure are described in detail above. For case of better implementing solutions in aspects of this disclosure, correspondingly, an apparatus in the aspects of this disclosure is provided below.

FIG. 10 is a schematic diagram of a structure of a page processing apparatus according to an aspect of this disclosure. The page processing apparatus shown in FIG. 10 may be installed in the terminal device 101 shown in FIG. 1 and configured to perform some or all of the functions in the method aspects described in FIG. 2 and FIG. 3. Refer to FIG. 10, the page processing apparatus includes:

- a display unit 1001, configured to: display an online document page, an entry to a first display page being displayed in the online document page, and the first display page belonging to an installation-free application, and display the first display page in response to the entry to the first display page being triggered; and
- a processing unit 1002, configured to maintain a display state of the online document page during the display of the first display page.

In an implementation, the display unit 1001 is configured to display the first display page in response to the entry to the first display page being triggered. The display unit 1001 is specifically configured to:

display the first display page on an upper layer of the online document page in response to the entry to the first display page being triggered; or display the online document page and the first display page in split screen in response to the entry to the first display page being triggered.

In an implementation, the display unit 1001 is configured to display the first display page on the upper layer of the online document page in response to the entry to the first display page being triggered. The display unit 1001 is specifically configured to:

display the first display page in a target area of the upper layer of the online document page in response to the entry to the first display page being triggered; or display the first display page on the upper layer of the online document page according to a preset transparency in response to the entry to the first display page being triggered.

In an implementation, the first display page is displayed on the upper layer of the online document page. The display unit 1001 is further configured to:

remove the first display page from the upper layer of the online document page in response to the first display page satisfying a removal condition.

That the first display page satisfies a removal condition includes any one of the following: that the first display page is closed is detected; that an order payment associated with the first display page is completed is detected; that a network resource associated with the first display page is downloaded is detected; and that a multimedia resource associated with the first display page is played successfully is detected.

In an implementation, the online document page is associated with N editors having editing permissions, and N is a positive integer. Content in an online document page corresponding to each editor is at least partially different. Online document pages corresponding to M editors among the N editors include the same first content item, and M is a positive integer less than or equal to N.

The display unit 1001 is further configured to:

update the first content item to an edited content item in a case that an editing operation on the first content item by any one of the M editors is detected; or in a case that an editing operation on the first content item by any one of the M editors is detected, display prompt information indicating that the first content item is edited.

In an implementation, the editing operation includes a recommendation operation. The display unit 1001 is configured to: update the first content item to the edited content item in a case that the editing operation on the first content item by any one of the M editors is detected. The display unit 1001 is specifically configured to:

perform highlighting on the first content item in a case that a recommendation operation on the first content item by any one of the M editors is detected; or in a case that a recommendation operation on the first content item by any one of the M editors is detected, generate an information display window and display relevant information about the first content item in the information display window.

The highlighting includes at least one of the following: highlight display, color switching display, bold display, font change display, and pin display. The relevant information about the first content item includes at least one of the following: recommender information and a number of views of the first content item.

In an implementation, the editing operation includes a favorite operation or a sharing operation. The display unit 1001 is configured to: in a case that an editing operation on the first content item by any one of the M editors is detected, display prompt information indicating that the first content item is edited. The display unit 1001 is specifically configured to:

in a case that a favorite operation on the first content item by any one of the M editors is detected, display prompt information indicating that the first content item is favorited; or in a case that a sharing operation on the first content item by any one of the M editors is detected, display prompt information indicating that the first content item is shared.

The prompt information indicating that the first content item is favorited includes at least one of the following: an identity of a user who makes favorites, a number of favorites, and a number of views. The prompt information indicating that the first content item is shared includes at least one of the following: an identity of a sharer, a number of shares, and a number of views.

In an implementation, the display unit 1001 is further configured to:

display a resource transfer result in the first display page in a case that a resource transfer operation in the first display page is detected.

In an implementation, the first display page includes a resource transfer entry. In a case that a resource transfer operation in the first display page is detected, the display unit 1001 is configured to display a resource transfer result in the first display page. The display unit 1001 is specifically configured to:

display order information in the first display page in response to the resource transfer entry being triggered; and display a resource transfer result in the first display page in a case that the order information is determined.

In an implementation, the first display page includes a multimedia playback window. The display unit 1001 is further configured to:

in a case that the multimedia playback window being triggered is detected, play multimedia content associated with the multimedia playback window.

In an implementation, the first display page includes a download control. The display unit 1001 is further configured to:

display a resource download process in a case that the download control being triggered is detected.

In an implementation, the online document page is associated with N recommended content receivers, and N is a positive integer. Recommend content in an online document page corresponding to each recommended content receiver is at least partially different. Online document pages of M recommended content receivers among the N recommended content receivers include the entry to the first display page, and M is a positive integer less than or equal to N.

The display unit 1001 is further configured to:

display task completion information in response to a task associated with the first display page in any one of the M recommended content receivers being completed.

The task completion information includes any one of the following: resource transfer information, playback information, and download information.

In an implementation, the display unit 1001 is further configured to:

update content displayed in the online document page in response to the online document page satisfying a content update condition.

That the online document page satisfies a content update condition includes at least one of the following: a refresh operation of the online document page is detected; that the content in the online document page is updated is detected; and that a current moment matches update time of the online document page is detected.

According to an aspect of this disclosure, some of the steps of the page processing methods shown in FIG. 2 and FIG. 3 may be performed by various units in the page processing apparatus shown in FIG. 10. For example, steps S201 and S202 shown in FIG. 2 may be performed by the display unit 1001 shown in FIG. 10. Step S301 to S304 shown in FIG. 3 may be performed by the display unit 1001 shown in FIG. 10. Units of the page processing apparatus shown in FIG. 10 may be separately or wholly combined into one or several other units, or one (or more) of the units herein may further be divided into a plurality of units with smaller functions. In this way, same operations can be implemented, and implementation of the technical effects of the aspects of this disclosure is not affected. The foregoing units are divided based on logical functions. In actual application, a function of one unit may be implemented by a plurality of units, or functions of a plurality of units are implemented by one unit. In another aspect of this disclosure, the page processing apparatus may also include another unit. During practical application, these functions may also be cooperatively implemented by another unit and may be cooperatively implemented by a plurality of units.

According to another aspect of this disclosure, a computer program (including program code) that can perform the steps of the corresponding method as shown in FIG. 2 and FIG. 3 may run on a general computing apparatus, for example, a computer device, that includes a processing element and a storage element such as a central processing unit (CPU), a random access memory (RAM), and a read-only memory (ROM), to construct the page processing apparatus shown in FIG. 10, and to implement the page processing method according to the aspects of this disclosure. The computer program may be recorded in, for example, a computer-readable recording medium, and may be loaded into the foregoing computing apparatus by using the computer-readable recording medium, and run in the computing apparatus.

The principles and beneficial effects of solving problems by the page processing apparatus provided in the aspects of this disclosure are similar to the principles and beneficial effects of solving the problems by the page processing method in the method aspects of this disclosure. Refer to the principles and beneficial effects of the implementation of the method. For concise description, this is not described herein again.

Figure 11:
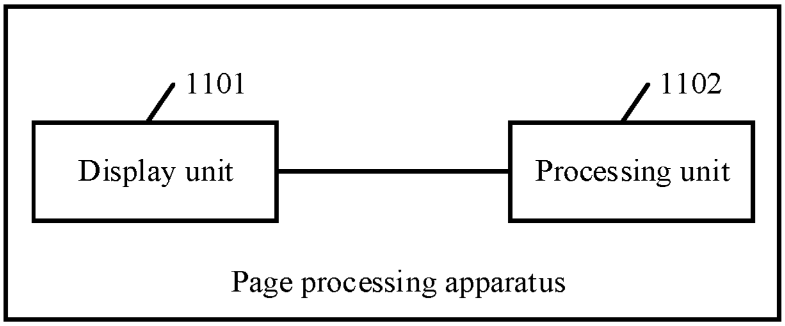
FIG. 11 is a schematic diagram of a structure of another page processing apparatus according to an aspect of this disclosure.

FIG. 11 is a schematic diagram of a structure of another page processing apparatus according to an aspect of this disclosure. The page processing apparatus shown in FIG. 11 may be installed in the third-party platform 102 shown in FIG. 1 and configured to perform some or all of the functions in the method aspects described in FIG. 5 and FIG. 6. Refer to FIG. 10, the page processing apparatus includes:

a display unit 1101, configured to: display a document preview page, a document template of an online document being displayed in the document preview page; and display an online document page in a case that a document generation condition being satisfied is detected, the online document page being generated based on the document template, the online document page displaying an entry to a first display page, and the first display page supporting a resource transfer operation.

In an implementation, the display unit 1101 is further configured to:

display P candidate recommendation types, P being a positive integer; and determine that a document generation condition is satisfied in response to at least one of the P candidate recommendation types being selected.

In an implementation, the page processing apparatus further includes a processing unit 1102. The processing unit 1102 is configured to:

obtain feature information of M recommended content receivers, M being a positive integer;

determine M groups of recommended content for the M recommended content receivers based on feature information of each recommended content receiver, one recommended content receiver corresponding to one group of recommended content, and each group of recommended content being at least partially different; and call a document development interface to generate M online documents based on the M groups of recommended content and the document template, the online document page being a page of one of the M online documents.

In an implementation, each group of recommended content includes object information about at least one object. The processing unit 1102 is configured to call the document development interface to generate M online documents based on the M groups of recommended content and the document template. The processing unit 1102 is specifically configured to:

write, according to the document template, object information in a group of recommended content into an online document corresponding to the group of recommended content.

In an implementation, object information about an object includes introduction information and an access path of the object. The processing unit 1102 is configured to write, according to the document template, object information in a group of recommended content into an online document corresponding to the group of recommended content. The processing unit 1102 is specifically configured to:

write, according to the document template, introduction information about an object in a group of recommended content into an online document corresponding to the group of recommended content; and generate, based on an access path of the object, an entry to a display page corresponding to the object; and write the entry to a display page corresponding to the object into an online document corresponding to recommended content to which the object belongs.

In an implementation, the processing unit 1102 is further configured to:

obtain a developer credential; and create the document template by calling the document development interface using the developer credential.

According to an aspect of this disclosure, some of the steps of the page processing methods shown in FIG. 5 and FIG. 6 may be performed by various units in the page processing apparatus shown in FIG. 11. For example, steps S501 and S502 shown in FIG. 5 may be performed by the display unit 1101 shown in FIG. 11. Steps S601 to S605 shown in FIG. 6 may be performed by the display unit 1101 shown in FIG. 11, and steps S602 to S604 may be performed by the processing unit 1102 shown in FIG. 11. Units of the page processing apparatus shown in FIG. 11 may be separately or wholly combined into one or several other units, or one (or more) of the units herein may further be divided into a plurality of units with smaller functions. In this way, same operations can be implemented, and implementation of the technical effects of the aspects of this disclosure is not affected. The foregoing units are divided based on logical functions. In actual application, a function of one unit may be implemented by a plurality of units, or functions of a plurality of units are implemented by one unit. In another aspect of this disclosure, the page processing apparatus may also include another unit. During practical application, these functions may also be cooperatively implemented by another unit and may be cooperatively implemented by a plurality of units.

According to another aspect of this disclosure, a computer program (including program code) that can perform the steps of the corresponding method as shown in FIG. 5 and FIG. 6 may run on a general computing apparatus, for example, a computer device, that includes a processing element and a storage element such as a central processing unit (CPU), a random access memory (RAM), and a read-only memory (ROM), to construct the page processing apparatus shown in FIG. 11, and to implement the page processing method according to the aspects of this disclosure. The computer program may be recorded in, for example, a computer-readable recording medium, and may be loaded into the foregoing computing apparatus by using the computer-readable recording medium, and run in the computing apparatus.

The principles and beneficial effects of solving problems by the page processing apparatus provided in the aspects of this disclosure are similar to the principles and beneficial effects of solving the problems by the page processing method in the method aspects of this disclosure. Refer to the principles and beneficial effects of the implementation of the method. For concise description, this is not described herein again.

Figure 12:
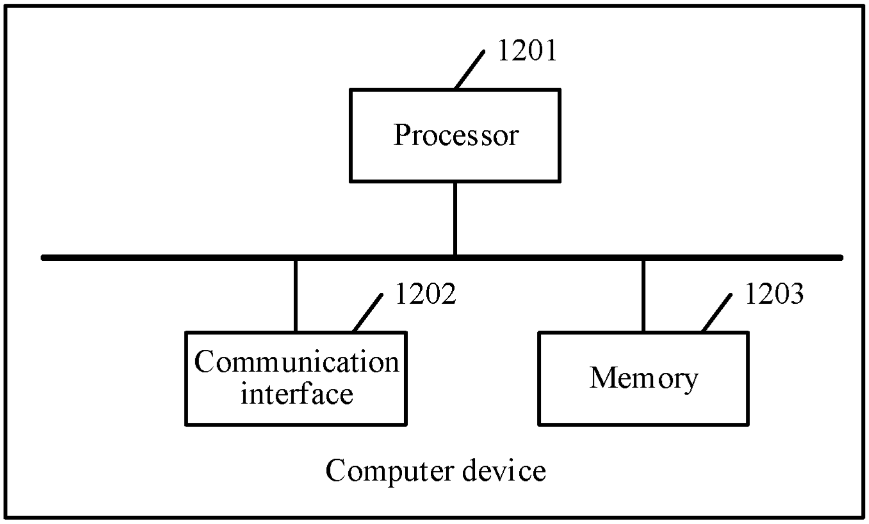
FIG. 12 is a schematic diagram of a structure of a computer device according to an aspect of this disclosure.

FIG. 12 is a schematic diagram of a structure of a computer device according to an aspect of this disclosure. The computer device may be a terminal device or a server. As shown in FIG. 12, the computer device includes at least a processor 1201 (e.g., processing circuitry), a communication interface 1202, and a memory 1203 (e.g., a non-transitory computer-readable storage medium). The processor 1201, the communication interface 1202, and the memory 1203 may be connected by using a bus or another manner. The processor 1201 (or referred to as a central processing unit (CPU)) is a computing core and control core of the computer device and may parse various instructions in the computer device and process various data of the computer device. For example: The CPU may be configured to parse on-off instructions sent by an object to the computer device, and control the computer device to perform on-off operations. For another example, the CPU may transmit various types of interactive data between internal structures of the computer device, and the like. In an aspect, the communication interface 1202 may include a standard wired interface and a standard wireless interface (such as Wi-Fi and a mobile communication interface), and is controlled by the processor 1201 to be configured to send and receive data. The communication interface 1202 may further be used for transmission and exchange of data within the computer device. The memory 1203 is a memory device in the computer device, and is configured to store a program and data. It may be understood that the memory 1203 here may include an internal memory of the computer device, and may also include an expanded memory supported by the computer device. The memory 1203 provides storage space storing an operating system of the computer device. The operating system includes but not limited to: an Android system, an Internetwork Operating System (IOS), and the like. This is not limited in this disclosure.

An aspect of this disclosure further provides a non-transitory computer-readable storage medium (Memory). The computer-readable storage medium is a memory device in a computer device, and is configured to store a program and data. It may be understood that the computer-readable storage medium here may include an internal storage medium of the computer device, and may also include an expanded storage medium supported by the computer device. The computer-readable storage medium provides storage space storing a processing system of the computer device. In addition, a computer program used for being loaded and executed by the processor 1201 is also stored in the storage space. The computer-readable storage medium here may be a high-speed RAM memory, or a non-volatile memory, for example, at least one magnetic disk storage. In one aspect, the computer-readable storage medium may be at least one computer-readable storage medium located away from the foregoing processor.

In an aspect, the processor 1201 performs the following operations by running the computer program in the memory 1203:

displaying an online document page, an entry to a first display page being displayed in the online document page, and the first display page belonging to an installation-free application;

displaying the first display page in response to the entry to the first display page being triggered; and maintaining a display state of the online document page during the display of the first display page.

As an aspect, the processor 1201 displays the first display page in response to the entry to the first display page being triggered. The specific aspect is:

displaying the first display page on an upper layer of the online document page in response to the entry to the first display page being triggered; or displaying the online document page and the first display page in split screen in response to the entry to the first display page being triggered.

As an aspect, the processor 1201 displays the first display page on the upper layer of the online document page in response to the entry to the first display page being triggered. The specific aspect is:

displaying the first display page in a target area of the upper layer of the online document page in response to the entry to the first display page being triggered; or displaying the first display page on the upper layer of the online document page according to a preset transparency in response to the entry to the first display page being triggered.

As an aspect, the first display page is displayed on the upper layer of the online document page, and the processor 1201 further performs the following operations by running the computer program in the memory 1203:

removing the first display page from the upper layer of the online document page in response to the first display page satisfying a removal condition.

That the first display page satisfies a removal condition includes any one of the following: that the first display page is closed is detected; that an order payment associated with the first display page is completed is detected; that a network resource associated with the first display page is downloaded is detected; and that a multimedia resource associated with the first display page is played successfully is detected.

As an aspect, the online document page is associated with N editors having editing permissions, and N is a positive integer. Content in an online document page corresponding to each editor is at least partially different. Online document pages corresponding to M editors among the N editors include the same first content item, and M is a positive integer less than or equal to N.

The processor 1201 further performs the following operations by running the computer program in the memory 1203:

updating the first content item to an edited content item in a case that an editing operation on the first content item by any one of the M editors is detected; or in a case that an editing operation on the first content item by any one of the M editors is detected, displaying prompt information indicating that the first content item is edited.

As an aspect, the editing operation includes a recommendation operation. The processor 1201 updates the first content item to the edited content item in a case that an editing operation on the first content item by any one of the M editors is detected. The specific aspect is:

perform highlighting on the first content item in a case that a recommendation operation on the first content item by any one of the M editors is detected; or in a case that a recommendation operation on the first content item by any one of the M editors is detected, generating an information display window and displaying relevant information about the first content item in the information display window.

The highlighting includes at least one of the following: highlight display, color switching display, bold display, font change display, and pin display. The relevant information about the first content item includes at least one of the following: recommender information and a number of views of the first content item.

As an aspect, the editing operation includes a favorite operation or a sharing operation. In a case that an editing operation on the first content item by any one of the M editors is detected, the processor 1201 displays prompt information indicating that the first content item is edited. The specific aspect is:

in a case that a favorite operation on the first content item by any one of the M editors is detected, displaying prompt information indicating that the first content item is favorited; or in a case that a sharing operation on the first content item by any one of the M editors is detected, displaying prompt information indicating that the first content item is shared.

The prompt information indicating that the first content item is favorited includes at least one of the following: an identity of a user who makes favorites, a number of favorites, and a number of views. The prompt information indicating that the first content item is shared includes at least one of the following: an identity of a sharer, a number of shares, and a number of views.

As an aspect, the processor 1201 further performs the following operations by running the computer program in the memory 1203:

displaying a resource transfer result in the first display page in a case that a resource transfer operation in the first display page is detected.

As an aspect, the first display page includes a resource transfer entry. The processor 1201 displays a resource transfer result in the first display page in a case that a resource transfer operation in the first display page is detected. The specific aspect is:

displaying order information in the first display page in response to the resource transfer entry being triggered; and displaying a resource transfer result in the first display page in a case that the order information is determined.

As an aspect, the first display page includes a multimedia playback window. The processor 1201 further performs the following operations by running the computer program in the memory 1203:

in a case that the multimedia playback window being triggered is detected, playing multimedia content associated with the multimedia playback window.

As an aspect, the first display page includes a download control corresponding to a target object. The processor 1201 further performs the following operations by running the computer program in the memory 1203:

in a case that the download control being triggered is detected, displaying a resource download process corresponding to the target object.

As an aspect, the online document page is associated with N recommended content receivers, and N is a positive integer. Recommend content in an online document page corresponding to each recommended content receiver is at least partially different. Online document pages of M recommended content receivers among the N recommended content receivers include the entry to the first display page, and M is a positive integer less than or equal to N.

The processor 1201 further performs the following operations by running the computer program in the memory 1203:

displaying task completion information in response to a task associated with the first display page in any one of the M recommended content receivers being completed.

The task completion information includes any one of the following: resource transfer information corresponding to the target object, playback information corresponding to the target object, and download information corresponding to the target object.

As an aspect, the processor 1201 further performs the following operations by running the computer program in the memory 1203:

updating content displayed in the online document page in response to the online document page satisfying a content update condition.

That the online document page satisfies a content update condition includes at least one of the following: a refresh operation of the online document page is detected; that the content in the online document page is updated is detected; and that a current moment matches update time of the online document page is detected.

In another aspect, the processor 1201 performs the following operations by running the computer program in the memory 1203:

displaying a document preview page, a document template of an online document being displayed in the document preview page; and displaying an online document page in a case that a document generation condition being satisfied is detected, the online document page being generated based on the document template, the online document page displaying an entry to a first display page, and the first display page supporting a resource transfer operation.

As an aspect, the processor 1201 further performs the following operations by running the computer program in the memory 1203:

displaying P candidate recommendation types, P being a positive integer; and determining that a document generation condition is satisfied in response to at least one of the P candidate recommendation types being selected.

As an aspect, the processor 1201 further performs the following operations by running the computer program in the memory 1203:

obtaining feature information of M recommended content receivers, M being a positive integer;

determining M groups of recommended content for the M recommended content receivers based on feature information of each recommended content receiver, one recommended content receiver corresponding to one group of recommended content, and each group of recommended content being at least partially different; and calling a document development interface to generate M online documents based on the M groups of recommended content and the document template, the online document page being a page of one of the M online documents.

As an aspect, each group of recommended content includes object information about at least one object. The processor 1201 calls a document development interface to generate M online documents based on the M groups of recommended content and the document template. The specific aspect is:

writing, according to the document template, object information in a group of recommended content into an online document corresponding to the group of recommended content.

As an aspect, object information about an object includes introduction information and an access path of the object. The processor 1201 writes object information in a group of recommended content into an online document corresponding to the group of recommended content according to the document template. The specific aspect is:

writing, according to the document template, introduction information about an object in a group of recommended content into an online document corresponding to the group of recommended content;

generating, based on an access path of the object, an entry to a display page corresponding to the object; and writing the entry to a display page corresponding to the object into an online document corresponding to recommended content to which the object belongs.

As an aspect, the processor 1201 further performs the following operations by running the computer program in the memory 1203:

obtaining a developer credential; and creating the document template by calling the document development interface using the developer credential.

The principles and beneficial effects of solving problems by the computer device provided in the aspects of this disclosure are similar to the principles and beneficial effects of solving the problems by the page processing method in the method aspects of this disclosure. Refer to the principles and beneficial effects of the implementation of the method. For concise description, this is not described herein again.

An aspect of this disclosure further provides a computer-readable storage medium, having a computer program stored thereon. The computer program is used for being loaded by the processor and performing the page processing method of the foregoing method aspect.

An aspect of this disclosure further provides a computer program product. The computer program product includes a computer program. The computer program is used for being loaded by the processor and performing the page processing method of the foregoing method aspect.

An aspect of this disclosure further provides a computer program product or computer program. The computer program product or computer program includes computer instructions stored in a computer-readable storage medium. A processor of a computer device reads the computer instructions from the computer-readable storage medium, and the processor executes the computer instructions, so that the computer device performs the foregoing page processing method.

The steps of the methods of the aspects of this disclosure may be reordered, combined, or deleted according to an actual need.

The modules of the apparatuses of the aspects of this disclosure may be combined, divided, or deleted according to an actual need.

A person of ordinary skill in the art may understand that, all or some steps in the methods of the foregoing aspects may be completed by instructing relevant hardware by using a program. The program may be stored in a computer-readable storage medium. The computer-readable storage medium may include: a flash drive, a read-only memory (ROM), a random access memory (RAM), a magnetic disk, an optical disc, and the like.

The term module (and other similar terms such as unit, submodule, etc.) in this disclosure may refer to a software module, a hardware module, or a combination thereof. A software module (e.g., computer program) may be developed using a computer programming language. A hardware module may be implemented using processing circuitry and/or memory. Each module can be implemented using one or more processors (or processors and memory). Likewise, a processor (or processors and memory) can be used to implement one or more modules. Moreover, each module can be part of an overall module that includes the functionalities of the module.

The foregoing disclosure includes some exemplary embodiments of this disclosure which are not intended to limit the scope of this disclosure. Other embodiments shall also fall within the scope of this disclosure.

What is claimed is:

1. A page processing method, comprising:

displaying an online document page, including a link to a first display page corresponding to an installation-free application;

displaying the first display page in response to the link to the first display page being triggered; and during the display of the first display page, maintaining a display state of the online document page such that input to the online document page is processed and displayed in the online document page and input to the first display page is processed and displayed in the first display page, wherein the online document page is configured to be displayed for N editors having editing permissions, and N is a positive integer, content in the online document page corresponding to different editors is at least partially different, the online document page corresponding to M editors among the N editors comprises a same first content item, and M is a positive integer less than or equal to N, and the method further comprises:

updating the first content item to an edited content item when an editing operation on the first content item by one of the M editors is detected; or displaying notification information indicating that the first content item is edited when the editing operation on the first content item by one of the M editors is detected.

2. The method according to claim 1, wherein the displaying the first display page in response to the link to the first display page being triggered comprises:

displaying the first display page on an upper layer of the online document page in response to the link to the first display page being triggered; or displaying the online document page and the first display page in split screen in response to the link to the first display page being triggered.

3. The method according to claim 2, wherein the displaying the first display page on the upper layer of the online document page in response to the link to the first display page being triggered comprises:

displaying the first display page in an area of the upper layer of the online document page in response to the link to the first display page being triggered; or displaying the first display page on the upper layer of the online document page according to a preset transparency in response to the link to the first display page being triggered.

4. The method according to claim 1, wherein the first display page is displayed on an upper layer of the online document page, the method further comprises:

removing the first display page from the upper layer of the online document page in response to the first display page satisfying a removal condition, and the removal condition comprises one of:

detecting that the first display page is closed;

detecting that an order payment associated with the first display page is completed;

detecting that a network resource associated with the first display page is downloaded; or detecting that a multimedia resource associated with the first display page is played successfully.

5. The method according to claim 1, wherein the editing operation comprises a recommendation operation, the updating the first content item to the edited content item when the editing operation on the first content item by the one of the M editors is detected comprises:

performing highlighting on the first content item when a recommendation operation on the first content item by the one of the M editors is detected; or when the recommendation operation on the first content item by the one of the M editors is detected, generating an information display window and displaying relevant information about the first content item in the information display window, the highlighting comprises at least one of: highlight display, color switching display, bold display, font change display, or pin display, and the relevant information about the first content item comprises at least one of: recommender information or a number of views of the first content item.

6. The method according to claim 1, wherein the editing operation comprises a favorite operation or a sharing operation, the displaying the notification information indicating that the first content item is edited when the editing operation on the first content item by the one of the M editors is detected comprises:

when the favorite operation on the first content item by the one of the M editors is detected, displaying first notification information indicating that the first content item is favorited; or when the sharing operation on the first content item by the one of the M editors is detected, displaying second notification information indicating that the first content item is shared, the first notification information indicating that the first content item is favorited comprises at least one of: an identity of a user who performed the favorite operation, a number of favorites, or a number of views, and the second notification information indicating that the first content item is shared comprises at least one of: an identity of a sharer, a number of shares, or a number of views.

7. The method according to claim 1, wherein the method further comprises:

displaying a resource transfer result in the first display page when a resource transfer operation in the first display page is detected.

8. The method according to claim 7, wherein the first display page comprises a resource transfer function, and the displaying the resource transfer result in the first display page when the resource transfer operation in the first display page is detected comprises:

displaying order information in the first display page in response to the resource transfer function being triggered; and displaying the resource transfer result in the first display page when the order information is determined.

9. The method according to claim 1, wherein the first display page comprises a multimedia playback window, and the method further comprises:

when the multimedia playback window is triggered, playing multimedia content associated with the multimedia playback window.

10. The method according to claim 1, wherein the first display page comprises a download control, and the method further comprises:

displaying a download process when the download control is detected.

11. The method according to claim 1, wherein the online document page is configured to be displayed for N' recommended content receivers, N' being a positive integer, recommendation content in the online document page corresponding to different recommended content receivers is at least partially different, the online document page of M' recommended content receivers among the N' recommended content receivers comprises the link to the first display page, M' being a positive integer less than or equal to N', and the method further comprises:

displaying task completion information when a task associated with the first display page for one of the M' recommended content receivers is completed, the task completion information comprising any one of: resource transfer information, playback information, or download information.

12. The method according to claim 1, wherein the method further comprises:

updating content displayed in the online document page when the online document page satisfies a content update condition, and the online document page satisfies the content update condition based on at least one of:

detection of a refresh operation of the online document page;

detection of an update of the content in the online document page, or; and detection of a current time matching an update time of the online document page.

13. A page processing apparatus, comprising:

processing circuitry configured to:

display an online document page, including a link to a first display page corresponding to an installation-free application, display the first display page in response to the link to the first display page being triggered; and during the display of the first display page, maintain a display state of the online document page such that input to the online document page is processed and displayed in the online document page and input to the first display page is processed and displayed in the first display page, wherein the online document page is configured to be displayed for N editors having editing permissions, and N is a positive integer, content in the online document page corresponding to different editors is at least partially different, the online document page corresponding to M editors among the N editors comprises a same first content item, and M is a positive integer less than or equal to N, and the processing circuitry is configured to:

update the first content item to an edited content item when an editing operation on the first content item by one of the M editors is detected; or display notification information indicating that the first content item is edited when the editing operation on the first content item by one of the M editors is detected.

14. The page processing apparatus according to claim 13, wherein, to display the first display page in response to the link to the first display page being triggered, the processing circuitry is configured to:

display the first display page on an upper layer of the online document page in response to the link to the first display page being triggered; or display the online document page and the first display page in split screen in response to the link to the first display page being triggered.

15. The page processing apparatus according to claim 14, wherein, to display the first display page on the upper layer of the online document page in response to the link to the first display page being triggered, the processing circuitry is configured to:

display the first display page in an area of the upper layer of the online document page in response to the link to the first display page being triggered; or display the first display page on the upper layer of the online document page according to a preset transparency in response to the link to the first display page being triggered.

16. The page processing apparatus according to claim 13, wherein the first display page is displayed on an upper layer of the online document page, the processing circuitry is configured to:

remove the first display page from the upper layer of the online document page in response to the first display page satisfying a removal condition, and the removal condition comprises one of:

detecting that the first display page is closed;

detecting that an order payment associated with the first display page is completed;

detecting that a network resource associated with the first display page is downloaded; or detecting that a multimedia resource associated with the first display page is played successfully.

17. The page processing apparatus according to claim 13, wherein the editing operation comprises a recommendation operation, to update the first content item to the edited content item when the editing operation on the first content item by the one of the M editors is detected, the processing circuitry is configured to:

perform highlighting on the first content item when a recommendation operation on the first content item by the one of the M editors is detected; or when the recommendation operation on the first content item by the one of the M editors is detected, generate an information display window and displaying relevant information about the first content item in the information display window, the highlighting comprises at least one of: highlight display, color switching display, bold display, font change display, or pin display, and the relevant information about the first content item comprises at least one of: recommender information or a number of views of the first content item.

18. The page processing apparatus according to claim 13, wherein the editing operation comprises a favorite operation or a sharing operation, to display the notification information indicating that the first content item is edited when the editing operation on the first content item by the one of the M editors is detected, the processing circuitry is configured to:

when the favorite operation on the first content item by the one of the M editors is detected, display first notification information indicating that the first content item is favorited; or when the sharing operation on the first content item by the one of the M editors is detected, display second notification information indicating that the first content item is shared, the first notification information indicating that the first content item is favorited comprises at least one of: an identity of a user who performed the favorite operation, a number of favorites, or a number of views, and the second notification information indicating that the first content item is shared comprises at least one of: an identity of a sharer, a number of shares, or a number of views.

19. The page processing apparatus according to claim 13, wherein the online document page is configured to be displayed for N' recommended content receivers, N' being a positive integer, recommendation content in the online document page corresponding to different recommended content receivers is at least partially different, the online document page of M' recommended content receivers among the N' recommended content receivers comprises the link to the first display page, M' being a positive integer less than or equal to N', and the processing circuitry is configured to:

display task completion information when a task associated with the first display page for one of the M' recommended content receivers is completed, the task completion information comprising any one of: resource transfer information, playback information, or download information.

20. A non-transitory computer-readable storage medium storing instructions which when executed by a processor cause the processor to perform a page processing method comprising:

displaying an online document page, including a link to a first display page corresponding to an installation-free application;

displaying the first display page in response to the link to the first display page being triggered; and during the display of the first display page, maintaining a display state of the online document page such that input to the online document page is processed and displayed in the online document page and input to the first display page is processed and displayed in the first display page, wherein the online document page is configured to be displayed for N editors having editing permissions, and N is a positive integer, content in the online document page corresponding to different editors is at least partially different, the online document page corresponding to M editors among the N editors comprises a same first content item, and M is a positive integer less than or equal to N, and the method further comprises:

updating the first content item to an edited content item when an editing operation on the first content item by one of the M editors is detected; or displaying notification information indicating that the first content item is edited when the editing operation on the first content item by one of the M editors is detected.

* * * * *